(12) United States Patent
Mohanty

(10) Patent No.: US 12,099,489 B2
(45) Date of Patent: Sep. 24, 2024

(54) INTELLIGENTLY STORING DATA IN A FAULT TOLERANT SYSTEM USING ROBOTIC PROCESS AUTOMATION AND BLOCKCHAIN

(71) Applicant: Bank of America Corporation, Charlotte, NC (US)

(72) Inventor: Swetapadma Mohanty, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 67 days.

(21) Appl. No.: 17/948,731

(22) Filed: Sep. 20, 2022

(65) Prior Publication Data

US 2024/0095225 A1    Mar. 21, 2024

(51) Int. Cl.
| | |
|---|---|
| *G06F 16/22* | (2019.01) |
| *G06F 16/23* | (2019.01) |
| *G06F 16/28* | (2019.01) |
| *G06F 21/31* | (2013.01) |

(52) U.S. Cl.
CPC ...... *G06F 16/2255* (2019.01); *G06F 16/2282* (2019.01); *G06F 16/2379* (2019.01); *G06F 16/288* (2019.01); *G06F 21/31* (2013.01); *G06F 2221/2141* (2013.01)

(58) Field of Classification Search
CPC ............ G06F 16/2255; G06F 16/2282; G06F 16/2379; G06F 16/288; G06F 21/31; G06F 2221/2141
See application file for complete search history.

(56) References Cited

U.S. PATENT DOCUMENTS

| | | | |
|---|---|---|---|
| 7,454,751 B2 | 11/2008 | Sun et al. | |
| 7,996,714 B2 | 8/2011 | O'Connell et al. | |
| 8,468,244 B2 | 6/2013 | Redlich et al. | |
| 10,621,510 B2 | 4/2020 | Saxena et al. | |
| 10,997,160 B1* | 5/2021 | Vig | G06F 16/2379 |
| 11,119,998 B1* | 9/2021 | Certain | G06F 16/2282 |
| 2018/0096163 A1* | 4/2018 | Jacques de Kadt | G06Q 20/203 |
| 2020/0117733 A1* | 4/2020 | Mueller | G06F 16/258 |
| 2020/0250174 A1* | 8/2020 | Padmanabhan | G06F 16/2365 |

(Continued)

FOREIGN PATENT DOCUMENTS

WO    WO-2020042805 A1 *    3/2020    .......... G06F 11/1474

*Primary Examiner* — Dennis Truong
(74) *Attorney, Agent, or Firm* — Banner & Witcoff, Ltd.

(57) ABSTRACT

Aspects of the disclosure relate to intelligently storing data in a fault tolerant system using robotic process automation and blockchain. The computing platform may generate a parent table to store a plurality of data points, wherein the parent table may comprise, for each data point of a plurality of data points, a row number, a row hash number, row hash nodes, a commit number, and/or commit nodes. The computing platform may identify relationships between the data points, and may generate a row hash node ledger and a commit node ledger to link the row hash nodes and the commit nodes to illustrate the relationships. The computing platform may receive a request to modify and/or restore the parent table. The computing platform may, based on determining an enterprise organization computing device is authorized to modify and/or restore the parent table, modify the ledgers to reflect changes to the parent table.

16 Claims, 12 Drawing Sheets

(56) References Cited

U.S. PATENT DOCUMENTS

2020/0349142 A1* 11/2020 Padmanabhan ..... G06F 16/2308
2020/0396065 A1* 12/2020 Gutierrez-Sheris .......................... H04L 9/3297
2021/0034455 A1* 2/2021 Deng ....................... H04L 9/14

* cited by examiner

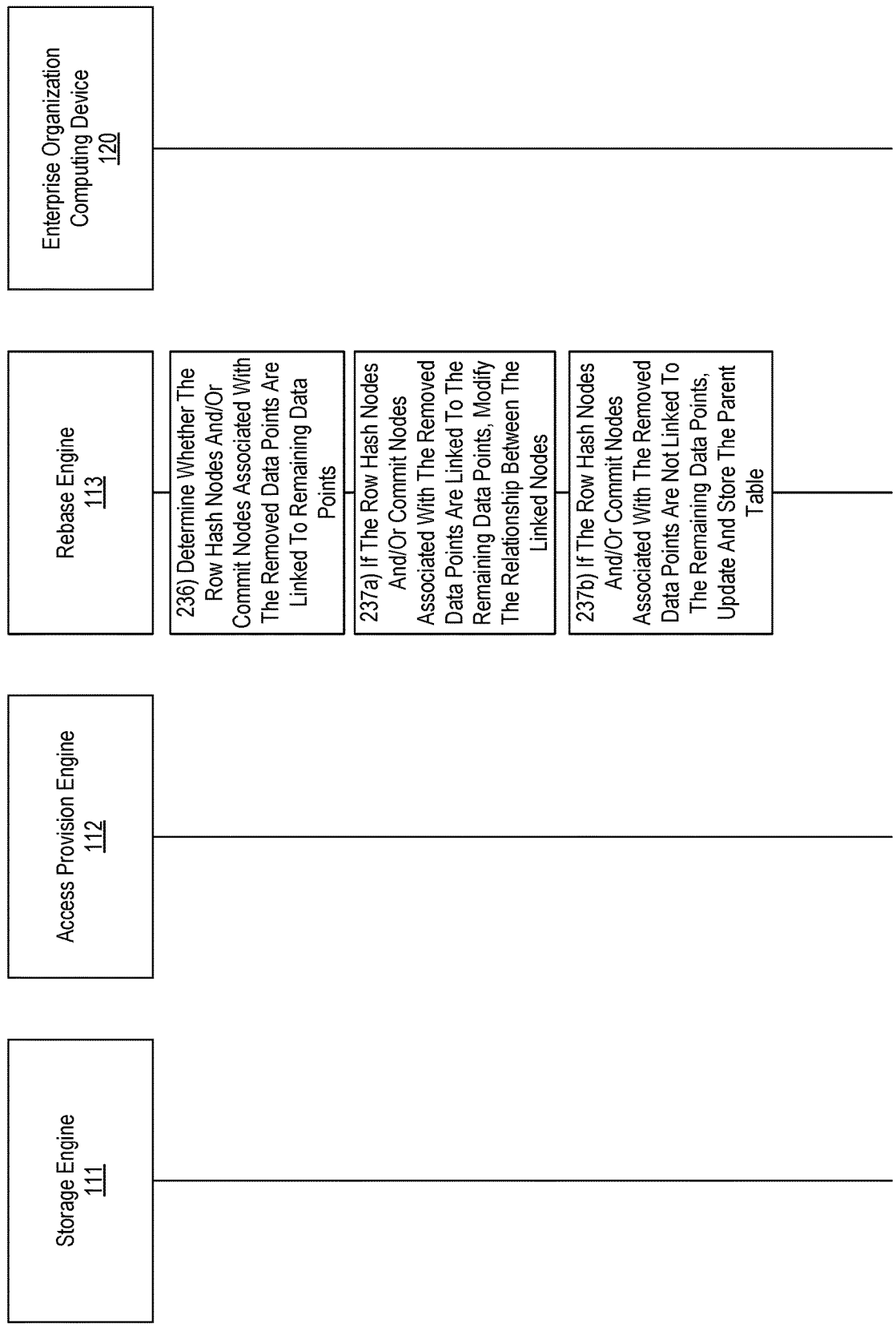

INTELLIGENTLY STORING DATA IN A FAULT TOLERANT SYSTEM USING ROBOTIC PROCESS AUTOMATION AND BLOCKCHAIN

BACKGROUND

Aspects of the disclosure relate to hardware and software for intelligently storing data in a fault tolerant system using robotic process automation and blockchain. In particular, one or more aspects of the disclosure may further relate to generating a parent table to store a plurality of data points, generating a row hash node ledger and a commit node ledger to illustrate and maintain relationships between the data points, and modifying the parent table, the row hash ledger, and the commit node ledger based on changes to the relationships between the data points.

One aspect of current data analysis and data storage procedures permits enterprise organizations to store enterprise organization data in at least one database. Access to the database may depend on a level of authorization associated with an enterprise organization computing device requesting access to the database. In some instances, the enterprise organization data may experience circumstances that may harm the enterprise organization data (e.g., the enterprise organization data may be incorrectly input into the at least one database, an unauthorized enterprise organization computing device may tamper with the enterprise organization data, or the like). In such instances, authorized enterprise organization computing devices may generate computer-executable code (e.g., restoral scripts, database restoration commands, or the like) that, when executed, may restore the enterprise organization data to a previous state. The authorized enterprise organization computing devices may submit the code to enterprise organization administration personnel for internal approval prior to execution. Therefore, current procedures for storing and restoring enterprise organization data may be time consuming (e.g., based on an amount of time needed to generate the code, based on an amount of time needed to receive internal approval of the code, or the like) and may require manual overhead.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with intelligently storing, in real-time or near real-time, data in a fault tolerant system using robotic process automation and blockchain.

In accordance with one or more embodiments, a method may comprise, at a computing device including one or more processors and memory, generating a first command to store a first plurality of data points. The method may comprise assigning a first commit number to each data point of the first plurality of data points, wherein the first commit number is used to generate a first plurality of commit nodes. The method may comprise generating a first plurality of row numbers, wherein a row number indicates a location of a data point within a parent table. The method may comprise generating, using the first plurality of row numbers, a first plurality of row hash numbers, wherein each row hash number is used to generate a first plurality of row hash nodes. The method may comprise generating, using the first plurality of row hash nodes, a row hash node ledger, wherein the row hash node ledger indicates relationships between data points. The method may comprise generating, using the first plurality of commit nodes, a commit node ledger, wherein the commit node ledger indicates the relationships between the data points. The method may comprise receiving, from an enterprise organization computing device, a request to modify a data point, of the first plurality of data points, within the parent table. The method may comprise identifying a first row hash node and a first commit node that correspond to the data point to be modified. The method may comprise modifying, within the row hash node ledger, a relationship between the first row hash node and a second row hash node that corresponds to a second data point comprising a modification to the data point. The method may comprise modifying, within the commit node ledger, a relationship between the first commit node and a second commit node that corresponds to the second data point.

In accordance with one or more embodiments, a computing platform may comprise at least one processor, a communication interface communicatively coupled to the at least one processor, and memory storing computer-readable instructions that, when executed by the at least one processor, cause the computing platform to generate a first command to store a first plurality of data points. The computing platform may assign a first commit number to each data point of the first plurality of data points, wherein the first commit number is used to generate a first plurality of commit nodes. The computing platform may generate a first plurality of row numbers, wherein a row number indicates a location of a data point within a parent table. The computing platform may generate, using the first plurality of row numbers, a first plurality of row hash numbers, wherein each row hash number is used to generate a first plurality of row hash nodes. The computing platform may generate, using the first plurality of row hash nodes, a row hash node ledger, wherein the row hash node ledger indicates relationships between data points. The computing platform may generate, using the first plurality of commit nodes, a commit node ledger, wherein the commit node ledger indicates the relationships between the data points. The computing platform may receive, from an enterprise organization computing device, a request to modify a data point, of the first plurality of data points, within the parent table. The computing platform may identify a first row hash node and a first commit node that correspond to the data point to be modified. The computing platform may modify, within the row hash node ledger, a relationship between the first row hash node and a second row hash node that corresponds to a second data point comprising a modification to the data point. The computing platform may modify, within the commit node ledger, a relationship between the first commit node and a second commit node that corresponds to the second data point.

In accordance with one or more embodiments, one or more non-transitory computer-readable media storing instructions that, when executed by a computing platform comprising at least one processor, memory, and a communication interface, cause the computing platform to generate a first command to store a first plurality of data points. The instructions, when executed, may cause the computing platform to assign a first commit number to each data point of the first plurality of data points, wherein the first commit number is used to generate a first plurality of commit nodes. The instructions, when executed, may cause the computing platform to generate a first plurality of row numbers, wherein a row number indicates a location of a data point within a parent table. The instructions, when executed, may cause the computing platform to generate, using the first plurality of row numbers, a first plurality of row hash numbers, wherein each row hash number is used to generate a first plurality of row hash nodes. The instructions, when executed, may cause the computing platform to generate, using the first plurality of row hash nodes, a row hash node ledger, wherein the row hash node ledger indicates relationships between data points. The instructions, when executed, may cause the computing platform to generate, using the first plurality of commit nodes, a commit node ledger, wherein the commit node ledger indicates the relationships between the data points. The instructions, when executed, may cause the computing platform to receive, from an enterprise organization computing device, a request to modify a data point, of the first plurality of data points, within the parent table. The instructions, when executed, may cause the computing platform to identify a first row hash node and a first commit node that correspond to the data point to be modified. The instructions, when executed, may cause the computing platform to modify, within the row hash node ledger, a relationship between the first row hash node and a second row hash node that corresponds to a second data point comprising a modification to the data point. The instructions, when executed, may cause the computing platform to modify, within the commit node ledger, a relationship between the first commit node and a second commit node that corresponds to the second data point.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which:

FIG. 2A-2H depict an illustrative event sequence for intelligently storing data in a fault tolerant system using robotic process automation and blockchain, in accordance with one or more example embodiments.

DETAILED DESCRIPTION

Figure 1A:
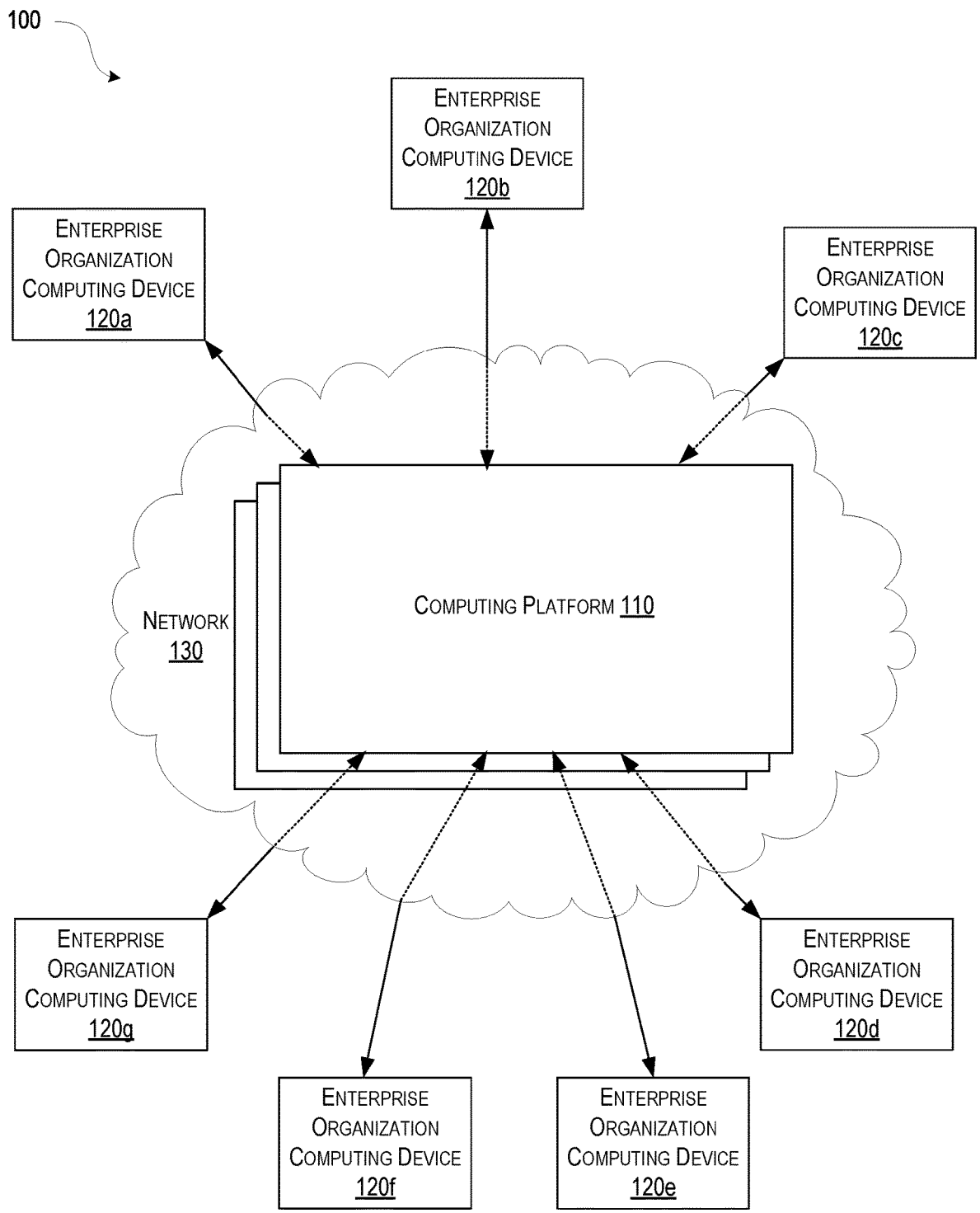
FIG. 1A depicts an illustrative example of a computer system for intelligently storing data in a fault tolerant system using robotic process automation and blockchain, in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current procedures for storing and restoring enterprise organization data may be time consuming (e.g., based on an amount of time needed to generate the code, based on an amount of time needed to receive internal approval of the code, or the like) and may require manual overhead. Accordingly, proposed herein is a solution to the problem described above that includes intelligently storing data in a fault tolerant system using robotic process automation and blockchain. For example, a computing platform may receive, from an enterprise organization computing device, a request to store a first plurality of data points in a database. The computing platform may generate a first instance of computer-executable code (e.g., a first INSERT command, a first INSERT script, or the like) to store the first plurality of data points, wherein each data point associated with the first instance of computer-executable code may correspond to a commit number. The computing platform may, for each data point of the first plurality of data points, determine a row number that may correspond to a location of each data point within the database. The computing platform may store, in the database, the commit number that corresponds to each data point of the first plurality of data points. The computing platform may generate a row hash number for each data point of the first plurality of data points. The computing platform may generate, using blockchain infrastructure, a row hash ledger to determine whether a first row hash node that corresponds to a first data point may be linked to a second row hash node that corresponds to a second data point (e.g., to determine whether to store a linked list, comprised of a plurality of row hash nodes, within a blockchain system, or the like). The computing platform may generate a commit node ledger to determine whether a first commit node that corresponds to the first data point may be linked to a second commit node that corresponds to the second data point (e.g., to determine whether to store a linked list, comprised of a plurality of commit nodes, within the blockchain system, or the like).

The computing platform may receive, from the enterprise organization computing device, a request to modify at least one data point of the first plurality of data points. The computing platform may determine whether the enterprise organization computing device is authorized to modify the enterprise organization data. If the computing platform determines that the enterprise organization computing device might not be authorized to modify the enterprise organization data, then the computing platform may transmit a notification to the enterprise organization computing device indicating denial of the modification request. Alternatively, if the computing platform determines that the enterprise organization computing device is authorized to modify the enterprise organization data, then the computing platform may modify the enterprise organization data.

In some examples, a computing environment may comprise the computing platform and/or a plurality of enterprise organization computing devices. In some instances, the computing platform may comprise a storage engine, an access provision engine, a rebase engine, a blockchain engine, an enterprise organization data database, and/or an access provision database. An enterprise organization computing device may identify a first plurality of data points to be stored in the database and may transmit a request to the storage engine to store the first plurality of data points. The storage engine may receive the request to store the first plurality of data points and may initiate the robotic automation process described herein.

Robotic automation processes may comprise a series of steps (e.g., commands, processes, objectives, or the like) that may be executed using a plurality of autonomous systems. Computing devices within the plurality of autonomous systems may be configured to operate in computing environments that may offer limited manual intervention. The autonomous system described herein may correspond to the computing platform and, as such, each one of the storage engine, access provision engine, rebase engine, and blockchain engine may be configured to execute the methods and processes described herein. Further, the method described herein may correspond to a sample implementation of robotic process automation that may be executed to intelligently store, in real-time or near real-time, data in a fault tolerant system using robotic process automation and blockchain. For example, each feature of the method described in detail below may correspond to a phase, command, and/or step of the sample implementation of robotic process automation. In some instances, the robotic process automation described herein may be executed based on receiving, by at least one computing device within the autonomous system, a request to store data points.

The storage engine may generate a first instance of computer-executable code to store the first plurality of data points in a parent table within the enterprise organization data database. The storage engine may include, in the first instance of computer-executable code, a commit number that corresponds to each data point of the first plurality of data points. The storage engine may assign (e.g., using a Merkle algorithm, using the blockchain engine, or the like) a row number to each data point of the first plurality of data points, wherein the row number may correspond to the location of the data point within the parent table.

The storage engine may generate a plurality of row hash numbers (e.g., using the Merkle algorithm, using the blockchain engine, or the like), wherein each row hash number of the plurality of row hash numbers may correspond to a different data point of the first plurality of data points. The storage engine may generate a row hash node ledger (e.g., a linked list within the blockchain system, or the like) comprising a first plurality of row hash nodes, wherein each row hash node of the first plurality of hash nodes may correspond to a different data point of the first plurality of data points and may indicate whether a first row hash node that corresponds to a first data point may be linked to a second row hash node that corresponds to a second data point. The storage engine may further generate a commit node ledger (e.g., a linked list within the blockchain system, or the like) comprising a first plurality of commit nodes, wherein each commit node of the first plurality of commit nodes may indicate whether a first commit node that corresponds to the first data point may be linked to a second commit node that corresponds to the second data point. The storage engine may store the first plurality of data points within the parent table as well as the corresponding commit number, row numbers, row hash numbers, an initial row hash node, and/or an initial commit node.

For each data point of the first plurality of data points, the access provision engine may identify a time associated with each commit number (e.g., a time indicating when each data point associated with the commit number was stored within the database, or the like). The access provision engine may generate a data structure to store the commit numbers and the corresponding times. The access provision engine may use the commit numbers to generate a graphical user interface (GUI) with which the enterprise organization computing device may interact (e.g., hover over a commit number to parse the corresponding data point, select a commit number, or the like).

The access provision engine may receive, from the enterprise organization computing device, a request to modify at least one data point of the first plurality of data points, wherein the request may comprise authorization credentials. The access provision engine may determine whether the enterprise organization computing device is authorized to modify the enterprise organization data. To do so, the access provision engine may parse the authorization credentials, parse the access provision database, and determine whether the authorization credentials are listed in the access provision database as being authorized to modify the enterprise organization data. If the access provision engine determines that the enterprise organization computing device might not be authorized to modify the enterprise organization data, then the access provision engine may transmit a notification to the enterprise organization computing device indicating denial of the modification request. Alternatively, if the access provision engine determines that the enterprise organization computing device is authorized to modify the enterprise organization data, then the access provision engine may instruct the rebase engine to retrieve the parent table from the enterprise organization data database and/or to cache the retrieved parent table.

The enterprise organization computing device may transmit, to the storage engine, a second plurality of data points (e.g., comprising at least one modification to a data point of the first plurality of data points, or the like). The storage engine may generate a second instance of computer-executable code (e.g., a second INSERT command, a second INSERT script, or the like) to add the at least one modified data point to the parent table, wherein each modified data point associated with the second instance of computer-executable code may correspond to a second commit number. The storage engine may generate a second plurality of row numbers and may assign a row number, of the second plurality of row numbers, to each modified data point. The storage engine may generate a second plurality of row hash numbers (e.g., using the Merkle algorithm, using the blockchain engine, or the like), wherein each row hash number of the second plurality of hash numbers may correspond to a different modified data point.

The storage engine may identify at least one data point of the first plurality of data points to be modified (e.g., updated, or the like) and may identify a row hash node that corresponds to the data point, of the first plurality of data points, to be modified. The storage engine may instruct the blockchain engine to link the row hash node that corresponds to the data point, of the first plurality of data points, to the row hash node that corresponds to the modified data point. The storage engine may identify the commit number, of the first plurality of commit numbers, that corresponds to the data point, of the first plurality of data points, to be modified. The storage engine may link the commit node that corresponds to the data point, of the first plurality of data points, to be modified to the commit node that corresponds to the modified data point. The storage engine may store the at least one modified data point within the parent table as well as the corresponding commit number, row number, row hash number, linked hash nodes, and/or linked commit nodes.

In some instances, the enterprise organization computing device may transmit, to the access provision engine, a request to restore the parent table to a previous state (e.g., restore the parent table such that only the data points that correspond to an elected commit number are displayed, or the like), wherein the request may comprise authorization credentials and the elected commit number. The access provision engine may use the received authorization credentials to determine whether the enterprise organization computing device is authorized to restore the parent table to a previous state. If the access provision engine determines that the enterprise organization computing device might not be authorized to restore the parent table, then the access provision engine may transmit a notification to the enterprise organization computing device indicating denial of the restoration request. Alternatively, if the access provision engine determines that the enterprise organization computing device is authorized to restore the parent table, then the access provision engine may instruct the rebase engine to retrieve the parent table from the enterprise organization data database and to cache the retrieved parent table.

The rebase engine may parse the parent table to determine whether a highest commit number indicated on the parent table corresponds to the elected commit number indicated in the restoration request. If the rebase engine determines that the highest commit number on the parent table corresponds to the elected commit number indicated in the restoration request, then the rebase engine may store the parent table in the enterprise organization data database. Alternatively, if the rebase engine determines that the highest commit number on the parent table might not correspond to the elected commit number indicated in the restoration request, then the rebase engine may remove (e.g., prune, delete, set to "NULL," or the like) the highest commit number from the parent table as well as the data points that correspond to the highest commit number. The rebase engine may identify the next highest commit number indicated in the parent table and may determine whether the next highest commit number corresponds to the elected commit number indicated in the restoration request. The rebase engine may continue this process until the highest commit number remaining in the parent table corresponds to the elected commit number indicated in the restoration request.

The rebase engine may determine whether the data points remaining in the parent table may be associated with a linked list of row hash nodes that comprises at least one row hash node that that corresponds to a data point that was removed from the parent table. If the rebase engine determines at least one remaining data point may be linked to a data point that was removed from the parent table, then the rebase engine may modify the relationship between the linked nodes (e.g., may remove (e.g., prune, delete, erase, or the like) the link (e.g., pointer, or the like) to the nodes associated with the data point that was removed from the parent table. Alternatively, if the rebase engine determines the remaining data points might not be linked to a data point that was removed from the parent table, then the rebase engine may store the restored parent table in the enterprise organization data database and/or may use the restored parent table to update the GUI.

Computer Architecture

FIG. 1A depicts an illustrative example of a computer system 100 that may be used for intelligently storing, in real-time or near real-time, data in a fault tolerant system using robotic process automation and blockchain, in accordance with one or more aspects described herein. Computer system 100 may comprise one or more computing devices including at least computing platform 110 and enterprise organization computing devices 120a-120g. While FIG. 1A depicts more than one enterprise organization computing device (e.g., enterprise organization computing devices 120a-120g), each of enterprise organization computing devices 120a-120g may be configured in accordance with the features described herein. While the description herein may refer to enterprise organization computing device 120, it is important to note that the functions described in connection with enterprise organization computing device 120 may also be performed by any one of enterprise organization computing devices 120a-120g. While FIG. 1A depicts enterprise organization computing devices 120a-120g, more or fewer enterprise organization computing devices may exist within computer system 100. Enterprise organization computing devices 120a-120g are depicted in FIG. 1A for illustration purposes only and are not meant to be limiting.

Each one of enterprise organization computing devices 120a-120g may be configured to communicate with computing platform 110 through network 130. In some arrangements, computer system 100 may include additional computing devices and networks that are not depicted in FIG. 1A, which may also be configured to interact with computing platform 110.

Computing platform 110 may be associated with a distinct entity such as an enterprise organization, company, school, government, and the like, and may comprise one or more personal computer(s), server computer(s), hand-held or laptop device(s), multiprocessor system(s), microprocessor-based system(s), set top box(es), programmable user electronic device(s), network personal computer(s) (PC), minicomputer(s), mainframe computer(s), distributed computing environment(s), and the like. Computing platform 110 may include computing hardware and software that may host various data and applications for performing tasks of the centralized entity and interacting with enterprise organization computing device 120, and/or additional computing devices. As discussed in greater detail below in connection with FIG. 1B, computing platform 110 may use storage engine 111, access provision engine 112, rebase engine 113, blockchain engine 114, enterprise organization data database 115, access provision database 116, database 117, and/or processor(s) 118 to analyze at least one request for access a parent table comprising a plurality of data points (e.g., a request to modify the parent table, a request to restore the parent table, or the like). Each computing device within computing platform 110 may contain database 117 and processor(s) 118, which may be stored in the memory of the one or more computing devices of computing platform 110. Through execution of computer-readable instructions stored in memory, the computing devices of computing platform 110 may be configured to perform functions of the centralized entity and store the data generated during the performance of such functions in database 117.

In some arrangements, computing platform 110 may include and/or be part of enterprise information technology infrastructure and may host a plurality of enterprise applications, enterprise databases, and/or other enterprise resources. Such applications may be executed on one or more computing devices included in computing platform 110 using distributed computing technology and/or the like. In some instances, computing platform 110 may include a relatively large number of servers that may support operations of the enterprise organization, such as a financial institution. Computing platform 110, in this embodiment, may generate a single centralized ledger, which may be stored in database 117, for data received from enterprise organization computing device 120.

Enterprise organization computing device 120 may be configured to interact with computing platform 110 through network 130. In some instances, enterprise organization computing device 120 may be configured to receive and transmit information corresponding to requests through particular channels and/or applications associated with computing platform 110. The requests submitted by enterprise organization computing device 120 may initiate the performance of particular computational functions at computing platform 110, such as the analysis of at least one request to modify the parent table and/or at least one request to restore the parent table.

As stated above, computer system 100 also may include one or more networks, which may interconnect one or more of computing platform 110 and enterprise organization computing device 120. For example, centralized computer system 100 may include network 130. Network 130 may include one or more sub-networks (e.g., local area networks (LANs), wide area networks (WANs), or the like). Furthermore, computer system 100 may include a local network configured to interconnect each of the computing devices comprising computing platform 110.

Enterprise organization computing device 120 may identify a plurality of data points to be stored in a parent table within enterprise organization data database 115. Enterprise organization data database 115 may comprise the plurality of data points associated with the enterprise organization (e.g., data points that correspond to enterprise organization projects, processes, objectives, personnel, or the like). In particular, enterprise organization data database 115 may comprise a parent table, wherein the parent table may be used to store the enterprise organization data. In some instances, the data within the parent table may be grouped (e.g., based on the enterprise organization process, objective, branch, or the like to which the data corresponds) and may be stored in the parent table based on the grouping.

Access to enterprise organization data database 115 may depend on the computing device requesting access (e.g., a hierarchy of accessibility). Enterprise organization computing device 120 may be associated with a first level of accessibility (e.g., a least restrictive level of accessibility). As such, an enterprise organization computing device 120 may be authorized to perform functions on the data within enterprise organization data database 115 (e.g., access the data, add data, remove data, modify data, or the like). In some instances, enterprise organization computing device 120 might not be authorized to perform functions on the data within enterprise organization data database 115 (e.g., enterprise organization computing device 120 might not be associated with authorization credentials that are listed in access provision database 116 as being authorized to add, remove, modify, restore the data, or the like). As such, enterprise organization computing device 120 may be permitted to view the data, but might not be permitted to add, remove, and/or modify the data without authorized authorization credentials. Storage engine 111, access provision engine 112, and rebase engine 113 may be associated with a second level of accessibility (e.g., a more restrictive level of accessibility that the first level of accessibility). Storage engine 111, access provision engine 112, and rebase engine 113 may be configured to view, add, remove, and/or modify the data based on receiving instructions from enterprise organization computing device 120, but might not be able to view, add, remove, and/or modify the data without explicit instructions from enterprise organization computing device 120.

Enterprise organization computing device 120 may transmit the plurality of data points to storage engine 111 as well as a request to store the plurality of data points within the parent table. In some instances, enterprise organization computing device 120 may transmit, to storage engine 111, a modification request (e.g., a request to modify the parent table, a request to modify at least one data point within the parent table, or the like) and/or a restoration request (e.g., a request to restore the parent table to a previous state, or the like). If access provision engine 112 determines that enterprise organization computing device 120 might not be authorized to modify and/or restore the parent table, then enterprise organization computing device 120 may receive, from storage engine 111, a notification indicating denial of the modification request and/or denial of the restoration request.

In some instances, enterprise organization computing device 120 may receive, from access provision engine 112, access to a graphical user interface (GUI) comprising commit numbers and/or times that correspond to each commit number. The GUI may allow enterprise organization computing device 120 to interact with the commit numbers displayed in the GUI (e.g., to hover over a commit number using at least one peripheral device, to select a commit number using at least one peripheral device, to parse at least one data point that corresponds to a commit number using at least one peripheral device, or the like). The data displayed in the GUI may correspond to the data stored within the parent table (e.g., each commit number stored in the parent table may be displayed in the GUI, each data point that corresponds to each commit node may be displayed in the GUI, or the like). In some instances, enterprise organization computing device 120 may parse the commit numbers and/or the corresponding data points displayed in the GUI to determine whether at least one data point within the parent table should be modified. Additionally or alternatively, enterprise organization computing device 120 may parse the commit numbers and/or the corresponding data points displayed in the GUI to determine whether to restore the parent table to a previous state (e.g., whether to restore the parent table such that the data points associated with an elected commit number are displayed in the parent table, or the like).

Figure 1B:
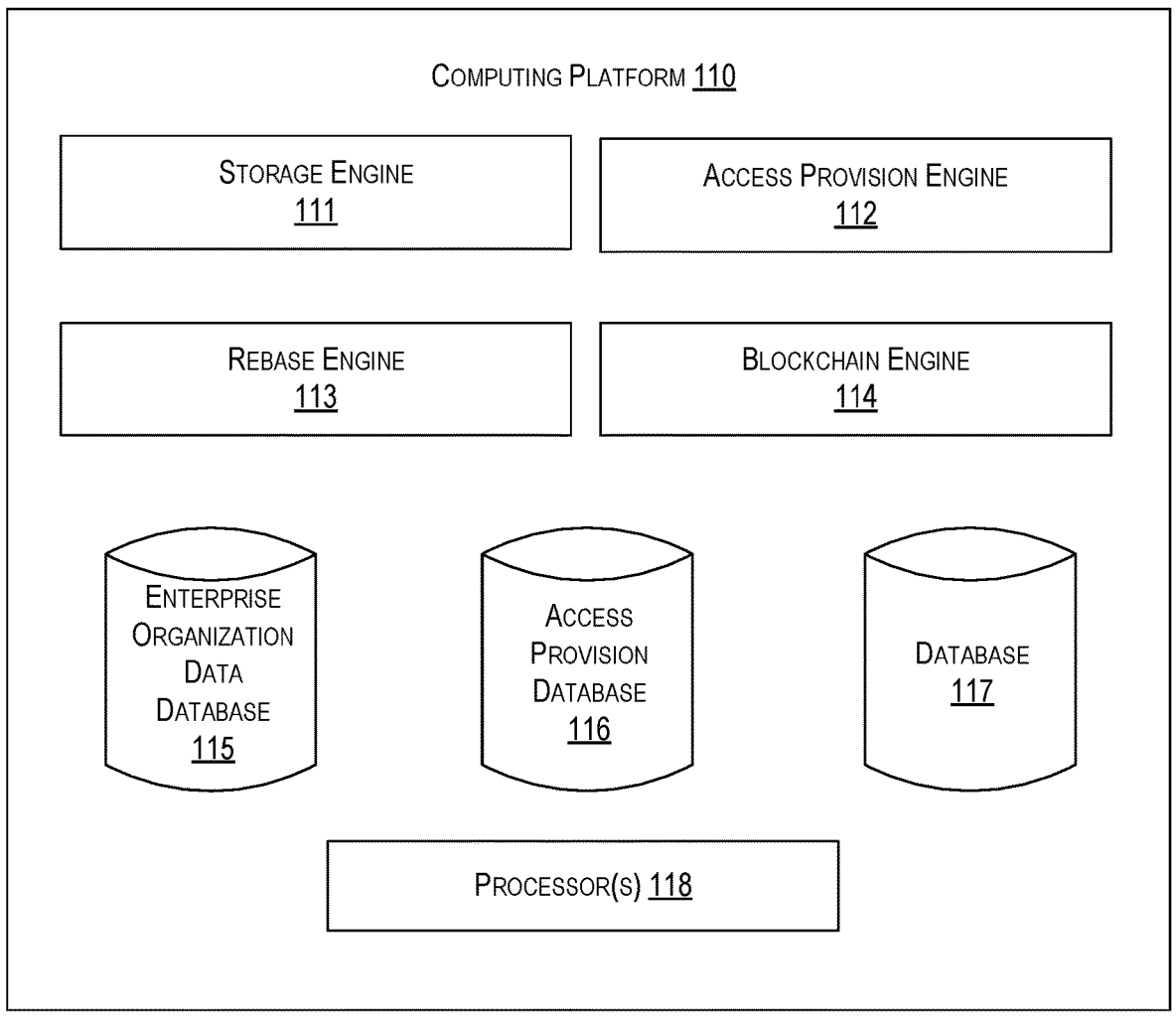
FIG. 1B depicts an illustrative example of the computing platform that may be used for intelligently storing data in a fault tolerant system using robotic process automation and blockchain, in accordance with one or more example embodiments.

FIG. 1B depicts the components of computing platform 110 that may be used for intelligently storing, in real-time or near real-time, data in a fault tolerant system using robotic process automation and blockchain, in accordance with one or more aspects described herein. As discussed in connection with FIG. 1A, computing platform 110 may comprise storage engine 111, access provision engine 112, rebase engine 113, blockchain engine 114, enterprise organization data database 115, access provision database 116, database 117, and/or processor(s) 118.

Storage engine 111 may receive, from enterprise organization computing device 120, a first plurality of data points to be stored in the parent table in enterprise organization data database 115. Storage engine 111 may draft, using at least one programming and/or scripting language, a command (e.g., an INSERT command, an ADD command, or the like) to store the first plurality of data points in the parent table. The command (e.g., the INSERT command, or the like) may comprise a commit number, wherein the addition of the commit number to the command may initiate the process of adding the first plurality of data points to the parent table. Storage engine 111 may assign, to each data point of the first plurality of data points, the commit number that corresponds to the first command. In some instances, failure to include the commit number to the command may result in an incomplete command and, consequently, the first plurality of data points might not be added to the parent table. As described below, the commit numbers may be used, by blockchain engine 114, to generate a linked list of commit nodes (e.g., a commit node ledger, or the like) to illustrate the relationships between data points.

Storage engine 111 may generate, for each data point of the first plurality of data points, a row number (e.g., such that each data point of the plurality of data points may be located within the parent table, or the like). The row number may correspond to rows within the parent table and the location of each data point within the parent table. Storage engine 111 may store, in the parent table, the row number that corresponds to each data point.

Storage engine 111 may generate, for each data point of the first plurality of data points, a row hash number. As described below, the row hash number may be used, by blockchain engine 114, to generate a linked list of row hash nodes (e.g., a row hash node ledger, or the like) to illustrate the relationship between a subset of data points (e.g., to illustrate an update to a first data point by linking the row hash node associated with the first data point to a row hash node associated with a second data point, wherein the second data point may contain the update to the first data point, or the like). To generate a row hash number for each data point, of the first plurality of data points, storage engine 111 may use at least one data verification and/or data storage algorithm (e.g., a Merkle tree, a Merkle hash algorithm, a blockchain system, or the like) that may generate a plurality of row hash numbers using a lightweight system. Storage engine 111 may store, in the parent table, the row hash numbers that corresponds to each data point.

Storage engine 111 may instruct blockchain engine 114 to generate, for each data point of the first plurality of data points, a plurality of row hash nodes to illustrate the relationships between data points. In some instances, storage engine 111 may instruct blockchain engine 114 to do so using a blockchain system (e.g., a ledger, a linked list, or the like). The ledger within the blockchain system may comprise a linked list, which may comprise a plurality of nodes (e.g., row hash nodes, or the like), wherein each row hash node of the plurality of row hash nodes may comprise a data block within the blockchain system. The blockchain system may further indicate the relationship between the row hash nodes (e.g., the linked list may indicate that a first data point associated with a first row hash node may correspond to a second data point associated with a second row hash node, or the like).

Storage engine 111 may continuously instruct blockchain engine 114 to generate additional data blocks (e.g., row hash nodes, or the like) based on receiving, from enterprise organization computing device 120, additional data points to be stored and the relationship between the data points to be stored. In some instances, storage engine 111 may receive a second plurality of data points to be stored, wherein the second plurality of data points may comprise modifications to the data points within the first plurality of data points. Storage engine 111 may transmit, to blockchain engine 114, details describing the relationship between the data points to be modified (e.g., the data points within the first plurality of data points, or the like) and the modified data points (e.g., the data points within the second plurality of data points, or the like).

Additionally or alternatively, storage engine 111 may receive, from enterprise organization computing device 120, an indication of a plurality of data points to be removed from the parent table. As such, storage engine 111 may transmit, to blockchain engine 114, details describing the relationship between the data points to be removed from the parent table and the data points remaining in the parent table (e.g., the row hash nodes that correspond to the data points to be removed from the parent table, the row hash nodes that correspond to the data points remaining in the parent table, the relationship between the row hash nodes, or the like).

Storage engine 111 may, for each data point of the first plurality of data points, identify a corresponding commit number. The commit number that corresponds to each data point may be the commit number associated with the command (e.g., the INSERT command, or the like) that may have been executed to add the data point to the parent table. Each data point associated with the command may be associated with the same commit number (e.g., data points within the first plurality of data points may correspond to the first INSERT command and, as such, may be associated with the same commit number, or the like). Data points within the parent table may correspond to different commit numbers if the data points were added to the parent table through different commands (e.g., data points within the first plurality of data points associated with a first command may correspond to a different commit number when compared to data points within the second plurality of data points associated with a second command, or the like).

Storage engine 111 may instruct blockchain engine 114 to generate, for each data point of the first plurality of data points, a plurality of commit nodes to illustrate the relationship between a subset of data points. In some instances, storage engine 111 may instruct blockchain engine 114 to do so using a blockchain system (e.g., a ledger, a linked list, or the like). The ledger within the blockchain system may comprise a linked list, which may comprise a plurality of nodes (e.g., commit nodes, or the like), wherein each commit node of the plurality of commit nodes may comprise a data block within the blockchain system. The blockchain system may further indicate the relationship between the commit nodes (e.g., the linked list may indicate that a first data point associated with a first commit node may correspond to a second data point associated with a second commit node, or the like).

Storage engine 111 may continuously instruct blockchain engine 114 to generate additional data blocks (e.g., commit nodes, or the like) based on receiving, from enterprise organization computing device 120, additional data points to be stored and the relationship between the data points to be stored. In some instances, storage engine 111 may receive the second plurality of data points to be stored, wherein the second plurality of data points may comprise modifications to the data points within the first plurality of data points. Storage engine 111 may transmit, to blockchain engine 114, details describing the relationship between the data points to be modified (e.g., the data points within the first plurality of data points, or the like) and the modified data points (e.g., the data points within the second plurality of data points, or the like).

Additionally or alternatively, storage engine 111 may receive, from enterprise organization computing device 120, an indication of a plurality of data points to be removed from the parent table. As such, storage engine 111 may transmit, to blockchain engine 114, details describing the relationship between the data points to be removed from the parent table and the data points remaining in the parent table (e.g., the commit nodes that correspond to the data points to be removed from the parent table, the commit nodes that correspond to the data points remaining in the parent table, the relationship between the commit nodes, or the like).

Storage engine 111 may detect a time that corresponds to the generation of each command (e.g., each INSERT command, or the like). Storage engine 111 may generate a data structure (e.g., a table different from the parent table, or the like) to present the times as well as the commit numbers that correspond to each command. Storage engine 111 may configure the data structure to display (e.g., using an overlay, using a hyperlink, or the like) the data points that correspond to each commit number displayed in the data structure. Storage engine 111 may transmit the data structure to access provision engine 112.

In some instances, enterprise organization computing device 120 may transmit a request to modify at least one data point within the parent table and, as such, storage engine 111 may receive, from access provision engine 112, instructions to process additional data points (e.g., data points to be added to the parent table, wherein the data points may comprise at least modification to the data points within the parent table, or the like). Similar to the processing (e.g., the robotic process automation associated with receiving the first plurality of data points, or the like) that may be executed in connection with the first plurality of data points, storage engine 111 may receive, from access provision engine 112, the additional data points. Storage engine 111 may generate a second command (e.g., a second INSERT command, a second ADD command, or the like). The second command may correspond to a different commit number when compared to the commit number that may correspond to the first command. As such, the data points associated with the second command (e.g., the additional data points to be stored in the parent table, or the like) may correspond to the commit number associated with the second command.

Storage engine 111 may generate, for each additional data point, a row number. The row number may correspond to rows within the parent table and the location of each additional data point within the parent table. Storage engine 111 may store, in the parent table, the row number that corresponds to each additional data point. Storage engine 111 may generate, for each additional data point, a row hash number. The row hash number associated with each additional data point may correspond to the row number associated with each additional data point. Storage engine 111 may store, in the parent table, the row hash numbers that correspond to each additional data point. As described below, the row hash numbers that correspond to the additional data points may be used to generate additional row hash nodes and to update the relationships indicated in the row hash node ledger.

Storage engine 111 may also instruct blockchain engine 114 to generate, for each additional data point, a second plurality of row hash nodes to illustrate the relationships between the data points (e.g., relationships between the additional points, relationships between the first plurality of data points and the additional data points, or the like). Storage engine 111 may identify, using the instructions from access provision engine 112, at least one data point in the parent table (e.g., at least one previously stored data point, or the like) to be modified. Storage engine 111 may identify the row hash node(s) associated with the at least one data point to be modified and may identify, using the additional data points and the instructions, at least one additional data point that comprises the modification. Storage engine 111 may identify the row hash node(s) associated with the at least one additional data point that comprises the modification, and may instruct blockchain engine 114 to link the row hash nodes (e.g., a modify the row hash node ledger, or the like). Furthermore, storage engine 111 may identify the commit node(s) associated with the at least one data point to be modified and may identify, using the additional data points and the instructions, at least one additional data point that comprises the modification. Storage engine 111 may identify the commit node(s) associated with the at least one additional data point that comprises the modification, and may instruct blockchain engine 114 to link the commit nodes (e.g., to modify the commit node ledger, or the like). Storage engine 111 may store the updated parent table in enterprise organization data database 115.

As illustrated in FIG. 1B, computing platform 110 may further comprise access provision engine 112. Access provision engine 112 may receive, from storage engine 111, the data structure that may comprise the times associated with the generation of each command. Access provision engine 112 may generate (e.g., using the data structure, or the like) a graphical user interface (GUI) to display the commit numbers, the time that corresponds to each commit number, and/or row numbers that correspond to each time. Access provision engine 112 may configure the GUI to receive input from enterprise organization computing device 120 (e.g., to detect whether a peripheral device associated with enterprise organization computing device 120 may be hovering over a commit number hyperlink, to detect whether enterprise organization computing device 120 may use a peripheral device to select (e.g., click on, or the like) the commit number hyperlink to review and/or parse the data points that correspond to the commit number, or the like).

In some instances, access provision engine 112 may review the interaction between enterprise organization computing device 120 and the GUI to identify at least one data point and/or commit number that enterprise organization computing device 120 may have reviewed. Access provision engine 112 may use the review of the interaction to identify at least one data point that enterprise organization computing device 120 may be interested in modifying and/or at least one commit number to which enterprise organization computing device 120 may be interested in restoring the parent table.

Access provision engine 112 may receive a plurality of requests from enterprise organization engine 120 (e.g., modification requests, restoration requests, or the like). In some instances, access provision engine 112 may receive, from enterprise organization computing device 120, a request to modify the parent table (e.g., a request to modify at least one previously stored data point, or the like). The modification request may comprise an indication of the data points to be modified as well as authorization credentials associated with enterprise organization computing device 120. Access provision engine 112 may parse the modification request and may extract the authorization credentials. Access provision engine 112 may parse the authorization credentials as well as access provision database 116 to determine whether the authorization credentials are listed in access provision database 116 as being authorized to modify the parent table. If access provision engine 112 determines that the authorization credentials associated with enterprise organization computing device 120 might not be listed in access provision database 116 as being authorized to modify the parent table, then access provision engine 112 may transmit a notification to enterprise organization computing device 120 indicating denial of the modification request. Alternatively, if access provision engine 112 determines that the authorization credentials associated with enterprise organization computing device 120 may be listed in access provision database 116 as being authorized to modify the parent table, then access provision engine 112 may transmit, to rebase engine 113, instructions to retrieve the parent table from enterprise organization data database 115 and/or to cache the parent table.

Access provision database 116 may comprise authorization credentials that correspond to a plurality of enterprise organization computing devices (e.g., enterprise organization computing devices 120a-120g, or the like). Access provision database 116 may be configured to store the authorization credentials based on whether the corresponding enterprise organization computing device is authorized to modify and/or restore the parent table. For example, the authorization credentials that correspond to enterprise organization computing devices that may be permitted to modify and/or restore the parent table may be stored separately from (e.g., within a different table, data structure, list, or the like) the authorization credentials that correspond to enterprise organization computing devices that might not be permitted to modify and/or restore the parent table.

Access to access provision database 116 may differ depending on the computing device requesting access (e.g., a hierarchy of accessibility, or the like). Access provision engine 112 may be associated with a first level of accessibility (e.g., a least restrictive level of accessibility). Access provision engine 112 may perform functions on the authorization credentials stored within access provision database 116 (e.g., access the authorization credentials, add authorization credentials, remove authorization credentials, edit authorization credentials, or the like). Enterprise organization computing device 120 may be associated with a second level of accessibility (e.g., a more restrictive level of accessibility than the first level of accessibility). Enterprise organization computing device 120 may view the authorization credentials to which it corresponds, but might not be permitted to view authorization credentials associated with other enterprise organization computing devices, add authorization credentials, remove authorization credentials, or modify the authorization credentials within access provision database 116. In some instances, enterprise organization computing device 120 may be configured to submit, to access provision engine 112, a request to update the authorization credentials that correspond to enterprise organization computing device 120 (e.g., based on enterprise organization computing device 120 determining that the corresponding authorization credentials listed in access provision database 116 might not reflect updates and/or changes to the authorization credentials, or the like).

Additionally or alternatively, access provision engine 112 may receive, from enterprise organization computing device 120, a request to restore the parent table to a previous state that corresponds to an elected commit number (e.g., a request to remove the data points that may have been added to the parent table after the elected commit number, or the like). The restoration request may comprise an indication of the elected commit number to which the parent table should be restored as well as authorization credentials associated with enterprise organization computing device 120. Similarly to the processing of the modification request, access provision engine 112 may parse the restoration request and may extract the authorization credentials. Access provision engine 112 may parse the authorization credentials as well as access provision database 116 to determine whether the authorization credentials are listed in access provision database 116 as being authorized to restore the parent table. If access provision engine 112 determines that the authorization credentials associated with enterprise organization computing device 120 might not be listed in access provision database 116 as being authorized to restore the parent table, then access provision engine 112 may transmit a notification to enterprise organization computing device 120 indicating denial of the restoration request. Alternatively, if access provision engine 112 determines that the authorization credentials associated with enterprise organization computing device 120 may be listed in access provision database 116 as being authorized to restore the parent table, then access provision engine 112 may transmit, to rebase engine 113, instructions to retrieve the parent table from enterprise organization data database 115 and/or to cache the parent table. The instructions may further indicate the elected commit number to which the parent table should be restored.

Rebase engine 113 may receive, from access provision engine 112, instructions to retrieve the parent table from enterprise organization data database 115 and/or to cache the retrieved parent table (e.g., based on access provision engine 112 receiving a modification and/or restoration request from enterprise organization computing device 120, based on access provision engine 112 determining that enterprise organization computing device 120 may be authorized to modify and/or restore the parent table, or the like). As such, rebase engine 113 may access enterprise organization data database 115 and may retrieve the parent table.

In some instances, rebase engine 113 may receive, from access provision engine 112, a notification indicating that enterprise organization computing device 120 is interested in restoring the parent table to a previous state that corresponds to an elected commit number. The notification from access provision engine 112 may further indicate the elected commit number to which the parent table should be restored. Rebase engine 113 may parse the notification to identify the elected commit number and may parse the parent table to identify the first highest commit number that may be indicated on the parent table (e.g., the largest commit number, the most recent commit number, or the like). Rebase engine 113 may determine whether the first highest commit number currently indicated on the parent table corresponds to (e.g., matches, is the same as, or the like) the elected commit number indicated in the restoration request.

If rebase engine 113 determines that the first highest commit number currently indicated on the parent table corresponds to the elected commit number indicated in the restoration request, then rebase engine 113 may store the parent table in enterprise organization data database 115. However, if rebase engine 113 determines that the first highest commit number currently indicated on the parent table does not correspond to the elected commit number indicated in the restoration request, then rebase engine 113 may remove (e.g., delete from the parent table, or the like) the first highest commit number from the parent table and, consequently, may remove the data points that correspond to the first highest commit number currently indicated on the parent table. Rebase engine 113 may analyze the second highest commit number indicated on the parent table (e.g., rebase engine 113 may reduce the first highest commit number by one to identify the second highest commit number, or the like), using the method described herein.

For example, rebase engine 113 may parse the second highest commit number and may determine whether the second highest commit number corresponds to the elected commit number indicated in the restoration request. If rebase engine 113 determines that the second highest commit number corresponds to the elected commit number indicated in the restoration request, then rebase engine 113 may store the updated parent table in enterprise organization data database 115 and/or may update the GUI (e.g., using the updated parent table, or the like). Alternatively, if rebase engine 113 determines that the second highest commit number does not correspond to the elected commit number indicated in the restoration request, then rebase engine 113 may remove (e.g., delete from the parent table, or the like) the second highest commit number from the parent table, may remove the data points that correspond to the second highest commit number currently indicated on the parent table, and may analyze the third highest commit number currently indicated on the parent table (e.g., rebase engine 113 may reduce the second highest commit number by one to identify the third highest commit number, or the like). Rebase engine 113 may repeat the process described herein until the highest number commit number indicated in the parent table corresponds to the elected commit number indicated in the restoration request.

Rebase engine 113 may also modify the linked lists (e.g., the row hash node ledger, the commit ledger, or the like) to reflect the removal of the data points from the parent table and to update the relationships associated with the data points that were removed from the parent table. To do so, rebase engine 113 may determine whether any row hash nodes and/or commit nodes that correspond to the data points remaining in the parent table correspond to (e.g., are linked to, are within the same linked list as, or the like) row hash nodes and/or commit nodes that correspond to the data points that may have been removed from the parent table. If rebase engine 113 determines that the nodes associated with the data points remaining the parent table may correspond to the nodes associated with data points that were removed from the parent table, then rebase engine 113 may instruct blockchain engine 114 to modify the linked lists accordingly, as discussed in detail below. Alternatively, if rebase engine 113 determines that the nodes associated with the data points remaining in the parent table might not correspond to the nodes associated with the data points that were removed from the parent table, then rebase engine 113 may store the updated parent table in enterprise organization data database 115 and/or may update the GUI (e.g., using the updated parent table, or the like).

Blockchain engine 114 may be configured to establish a blockchain system as well as a plurality of linked lists and/or ledgers (e.g., the row hash node ledger, the commit node ledger, or the like) within the blockchain system. Blockchain engine 114 may receive, from storage engine 111, instructions to generate a plurality of row hash nodes (e.g., instructions to generate a row hash node for each data point to be added to the parent table, or the like) and a plurality of commit nodes (e.g., instructions to generate a commit node for each data point to be added to the parent table, or the like). Blockchain engine 114 may generate a data block for each data point to be added to the parent table, wherein the data block may correspond to a row hash node, a commit node, or the like. Blockchain engine 114 may group the plurality of row hash nodes to generate the row hash node ledger. Similarly, blockchain engine 114 may group the plurality of commit nodes to generate the commit node leger.

Blockchain engine 114 may further receive, from storage engine 111, a notification indicating that at least one additional data point to be added to the parent table may correspond to a previously stored data point. The notification may further indicate the additional data points and the previously stored data points to which the additional data points may correspond. Blockchain engine 114 may also receive, from storage engine 111, instructions to generate additional data blocks (e.g., additional row hash nodes, additional commit nodes, or the like). As such, blockchain engine 114 may generate at least one additional row hash node and at least one additional commit node. Blockchain engine 114 may parse the row hash node ledger to identify the row hash nodes that correspond to the previously stored data points. Blockchain engine 114 may link the row hash nodes that correspond to the additional data points to the identified row hash nodes that correspond to the previously stored data points. Blockchain engine 114 may store the updated row hash node ledger in the blockchain system. Similarly, blockchain engine 114 may parse the commit node ledger to identify the commit nodes that correspond to the previously stored data points. Blockchain engine 114 may link the commit nodes that correspond to the additional data points to the identified commit nodes that correspond to the previously stored data points. Blockchain engine 114 may store the updated commit node ledger in the blockchain system.

In some instances, blockchain engine 114 may receive, from storage engine 111, a notification indicating at least one data point to be removed from the parent table (e.g., at least one data block to be removed from at least one of the row hash node ledger and/or the commit node ledger, or the like). Blockchain engine 114 may identify the row hash node that may correspond to the data point to be removed from the parent table and may prune (e.g., remove, delete, set to "NULL," or the like) the row hash node. Similarly, blockchain engine 114 may identify the commit node that may correspond to the data point to be removed from the parent table and may prune the commit node.

In some instances, blockchain engine 114 may receive, from rebase engine 113, instructions to determine whether data points remaining in the parent table (e.g., after the parent table is restored to a previous state that corresponds to the elected commit number, or the like) may be linked to data points that may have been removed from the parent table. To do so, blockchain engine 114 may parse the parent table to determine the row hash nodes and/or commit nodes that correspond to the data points remaining in the parent table. Blockchain engine 114 may determine, using the row hash node ledger and/or the commit node ledger, whether the row hash nodes and/or commit nodes that correspond to the remaining data points are linked to row hash nodes and/or commit nodes that correspond to the removed data points.

If blockchain engine 114 determines that the row hash nodes and/or commit nodes that correspond to the remaining data points are linked to row hash nodes and/or commit nodes that correspond to the removed data points, then blockchain engine 114 may modify the row hash node ledger and/or the commit node ledger. In particular, blockchain engine 114 may remove (e.g., prune, delete, erase, set to "NULL," remove the pointer between, or the like) the link between the row hash node and/or commit node that corresponds to the remaining data point and the row hash node and/or commit node that corresponds to the removed data point.

Alternatively, if blockchain engine 114 determines that the row hash nodes and/or commit nodes that correspond to the remaining data points might not be linked to row hash nodes and/or commit nodes that correspond to the removed data points, then rebase engine 113 may store the restored parent table in enterprise organization data database 115.

Intelligently Storing Data in a Fault Tolerant System Using Robotic Process Automation and Blockchain FIGS. 2A-2H depict an illustrative event sequence for intelligently storing, in real-time or near real-time, data in a fault tolerant system using robotic process automation and blockchain, in accordance with one or more aspects described herein. While aspects described with respect to FIGS. 2A-2H include the evaluation of a single request (e.g., a modification request, a restoration request, or the like), a plurality of requests may be received and evaluated (e.g., in parallel) without departing from the present disclosure.

Figure 2A:
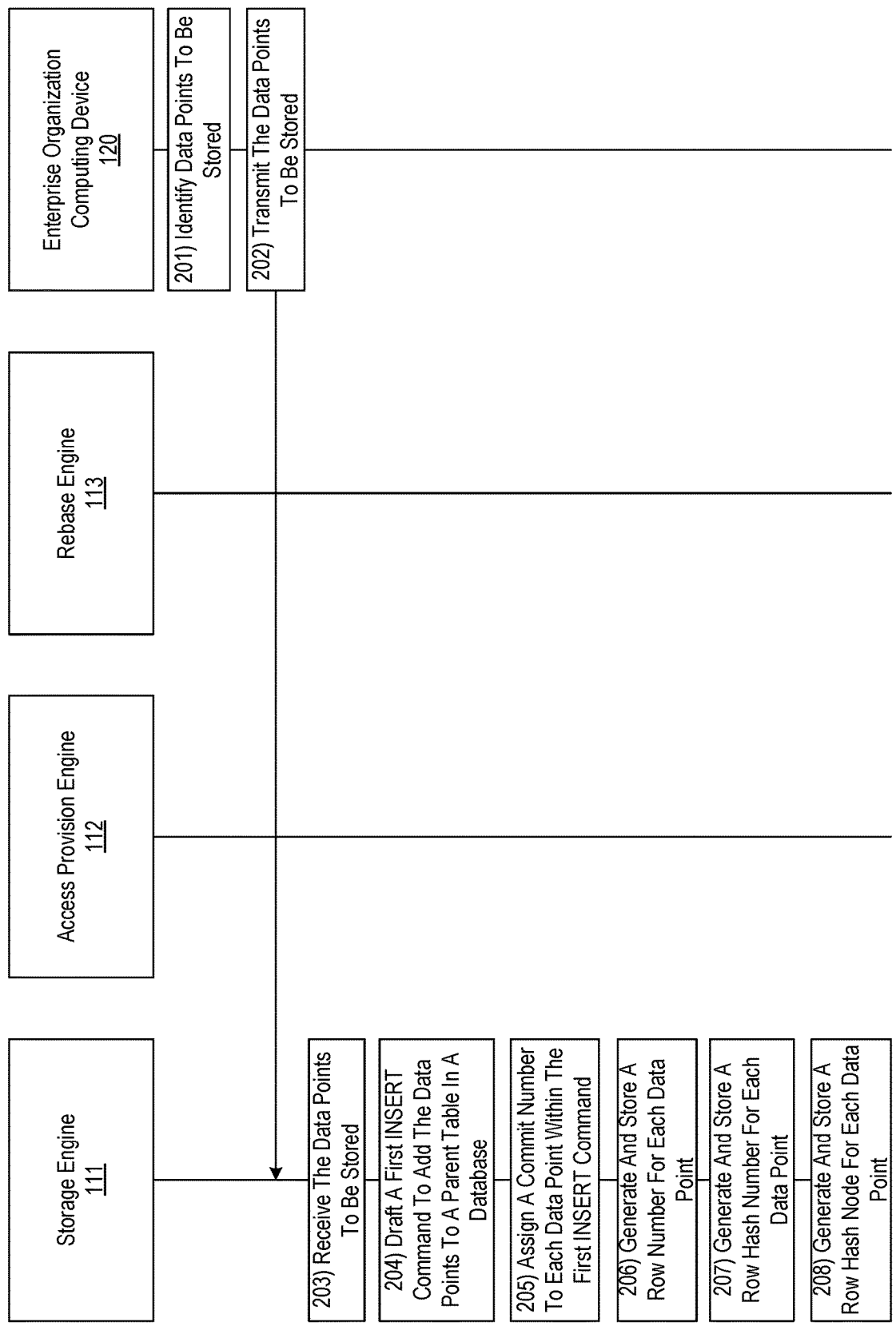

Referring to FIG. 2A, at step 201, enterprise organization computing device 120 may identify a first plurality of data points to be stored in a parent table within enterprise organization data database 115 (e.g., data points that correspond to enterprise organization projects, processes, objectives, personnel, or the like). At step 202, enterprise organization computing device 120 may transmit, to storage engine 111 and across network 130, the first plurality of data points as well as a request to store the first plurality of data points within the parent table.

At step 203, storage engine 111 may receive, from enterprise organization computing device 120, the first plurality of data points to be stored in the parent table in enterprise organization data database 115. At step 204, storage engine 111 may draft, using at least one programming and/or scripting language, a first command (e.g., a first INSERT command, a first ADD command, or the like) to store the first plurality of data points in the parent table. The first command (e.g., the INSERT command, or the like) may comprise a commit number, wherein the addition of the commit number to the first command may initiate the process of adding the first plurality of data points to the parent table.

At step 205, storage engine 111 may assign, to each data point of the first plurality of data points, the commit number that corresponds to the first command. At step 206, storage engine 111 may generate, for each data point of the first plurality of data points, a row number (e.g., such that each data point may be located within the parent table, or the like). The row number may correspond to the rows within the parent table and the location of each data point within the parent table. Storage engine 111 may store, in the parent table, the row numbers that correspond to each data point of the first plurality of data points.

At step 207, storage engine 111 may generate, for each data point of the first plurality of data points, a row hash number (e.g., a hash of the row number, or the like). A row hash number may be an indicator (e.g., a way to track the corresponding data point, or the like) that may be used to illustrate the relationship between the corresponding data point and other data points within the parent table. To generate a row hash number for each data point, of the first plurality of data points, storage engine 111 may use at least one data verification and/or data storage algorithm (e.g., a Merkle tree, a Merkle hash algorithm, a blockchain system, or the like) that may generate a plurality of row hash numbers using a lightweight system. Storage engine 111 may store, in the parent table, the row hash numbers that correspond to each data point of the first plurality of data points. The row hash numbers may be used, by blockchain engine 114, to generate a linked list of row hash nodes (e.g., a row hash node ledger, or the like).

At step 208, storage engine 111 may instruct blockchain engine 114 to generate, for each data point of the first plurality of data points, a plurality of row hash nodes to illustrate the relationships between data points. In some instances, storage engine 111 may instruct blockchain engine 114 to do so using a blockchain system (e.g., a ledger, a linked list, or the like). The ledger within the blockchain system may comprise a linked list, which may comprise a plurality of nodes (e.g., row hash nodes, or the like), wherein each row hash node of the plurality of row hash nodes may comprise a data block within the blockchain system. The blockchain system may further indicate the relationship between the row hash nodes (e.g., the linked list may indicate that a first data point associated with a first row hash node may correspond to a second data point associated with a second row hash node, or the like).

Figure 2B:
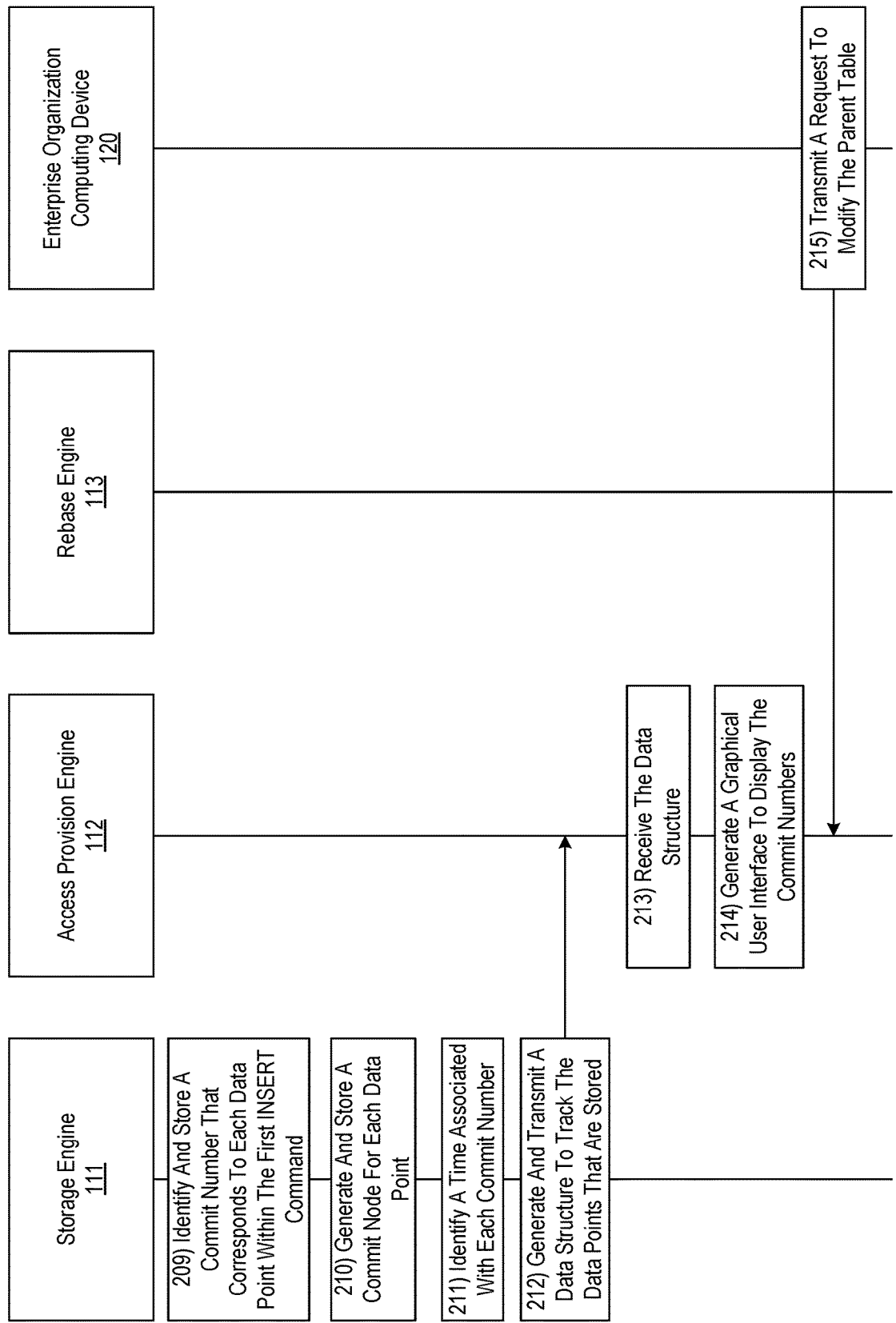

Referring to FIG. 2B, at step 209, storage engine 111 may store the commit number associated with each data point within the first plurality of data points (e.g., the commit number associated with the first command, or the like). To do so, storage engine 111 may identify the data points, of the first plurality of data points, associated with the first command. Storage engine 111 may further identify the commit number that corresponds to the first command and, by extension, corresponds to the data points associated with the first command.

At step 210, storage engine 111 may instruct blockchain engine 114 to generate, for each data point of the first plurality of data points, a plurality of commit nodes to illustrate the relationships between the data points. In some instances, storage engine 111 may instruct blockchain engine 114 to do so using a blockchain system (e.g., a ledger, a linked list, or the like). The ledger within the blockchain system may comprise a linked list, which may comprise a plurality of nodes (e.g., commit nodes, or the like), wherein each commit node of the plurality of commit nodes may comprise a data block within the blockchain system. The blockchain system may further indicate the relationship between the commit nodes (e.g., the linked list may indicate that a first data point associated with a first commit node may correspond to a second data point associated with a second commit node, or the like).

At step 211, storage engine 111 may determine a time that corresponds to the generation of first command (e.g., the first INSERT command, or the like). In some instances, the time may indicate a time at which each data point, of the first plurality of data points, was added to the parent table. At step 212, storage engine 111 may generate a data structure (e.g., a table different from the parent table, or the like) to present the times as well as the commit numbers and commands that correspond to each time. Storage engine 111 may transmit the data structure to access provision engine 112.

At step 213, access provision engine 112 may receive the data structure. At step 214, access provision engine 112 may generate (e.g., using the data structure, or the like) a graphical user interface (GUI) to display the commit numbers, the time that corresponds to each commit number, and/or row numbers that correspond to each time. Access provision engine 112 may configure the GUI to receive input from enterprise organization computing device 120 (e.g., to detect whether a peripheral device associated with enterprise organization computing device 120 may be hovering over a commit number hyperlink, to detect whether enterprise organization computing device 120 may use a peripheral device to select (e.g., click on, or the like) the commit number hyperlink to review and/or parse the data points that correspond to the commit number, or the like).

At step 215, enterprise organization computing device 120 may transmit, to access provision engine 112, a request to modify the parent table (e.g., a modification request, or the like). The modification request may comprise an indication of the data points within the parent table to be modified and/or additional data points to be added to the parent table, wherein the additional data points may comprise the modifications. The modification request may further comprise authorization credentials that correspond to enterprise organization computing device 120, which may be used to determine whether enterprise organization computing device 120 is authorized to modify the parent table.

Figure 2C:
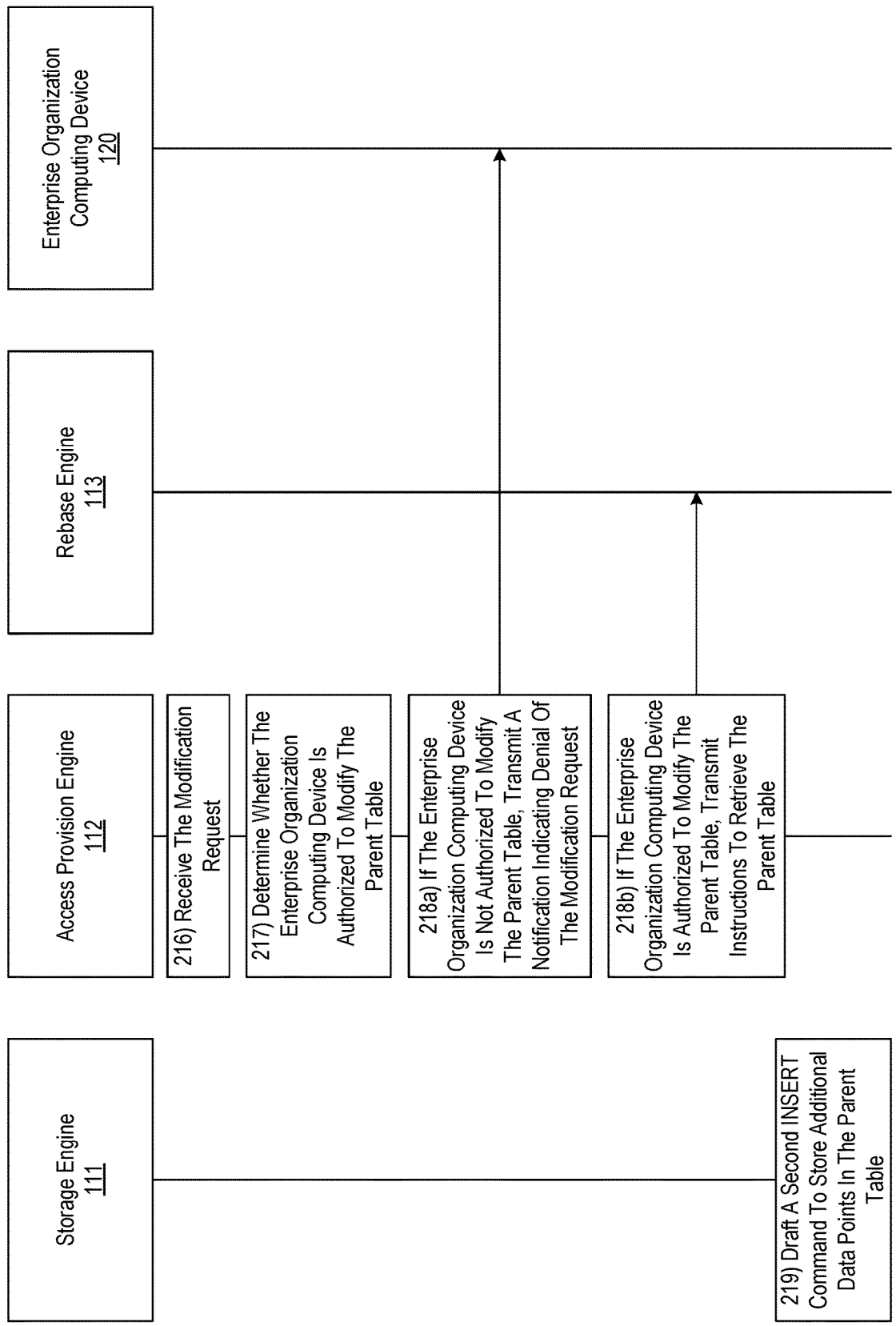

Referring to FIG. 2C, at step 216, access provision engine 112 may receive the modification request from enterprise organization computing device 120. Access provision engine 112 may parse the modification request and may extract the authorization credentials. At step 217, access provision engine 112 may determine, using the extracted authorization credentials, whether enterprise organization computing device 120 is authorized to modify the parent table. To do so, access provision engine 112 may parse the authorization credentials as well as access provision database 116 to determine whether the authorization credentials are listed in access provision database 116 as being authorized to modify the parent table. If, at step 217, access provision engine 112 determines that enterprise organization computing device 120 might not be authorized to modify the parent table, then, at step 218a, access provision engine 112 may transmit a notification to enterprise organization computing device 120 indicating denial of the modification request. Alternatively, if, at step 217, access provision engine 112 determines that enterprise organization computing device 120 may be authorized to modify the parent table, then, at step 218b, access provision engine 112 may transmit, to rebase engine 113, instructions to retrieve the parent table from enterprise organization data database 115 and/or to cache the parent table.

At step 219, storage engine 111 may generate a second command (e.g., a second INSERT command, a second ADD command, or the like) to store additional data points (e.g., a second plurality of data points, data points that may modify data points within the first plurality of data points, or the like). The second command may correspond to a different commit number when compared to the commit number that may correspond to the first command. As such, the data points associated with the second command (e.g., the additional data points to be stored in the parent table, or the like) may correspond to the commit number associated with the second command.

Figure 2D:
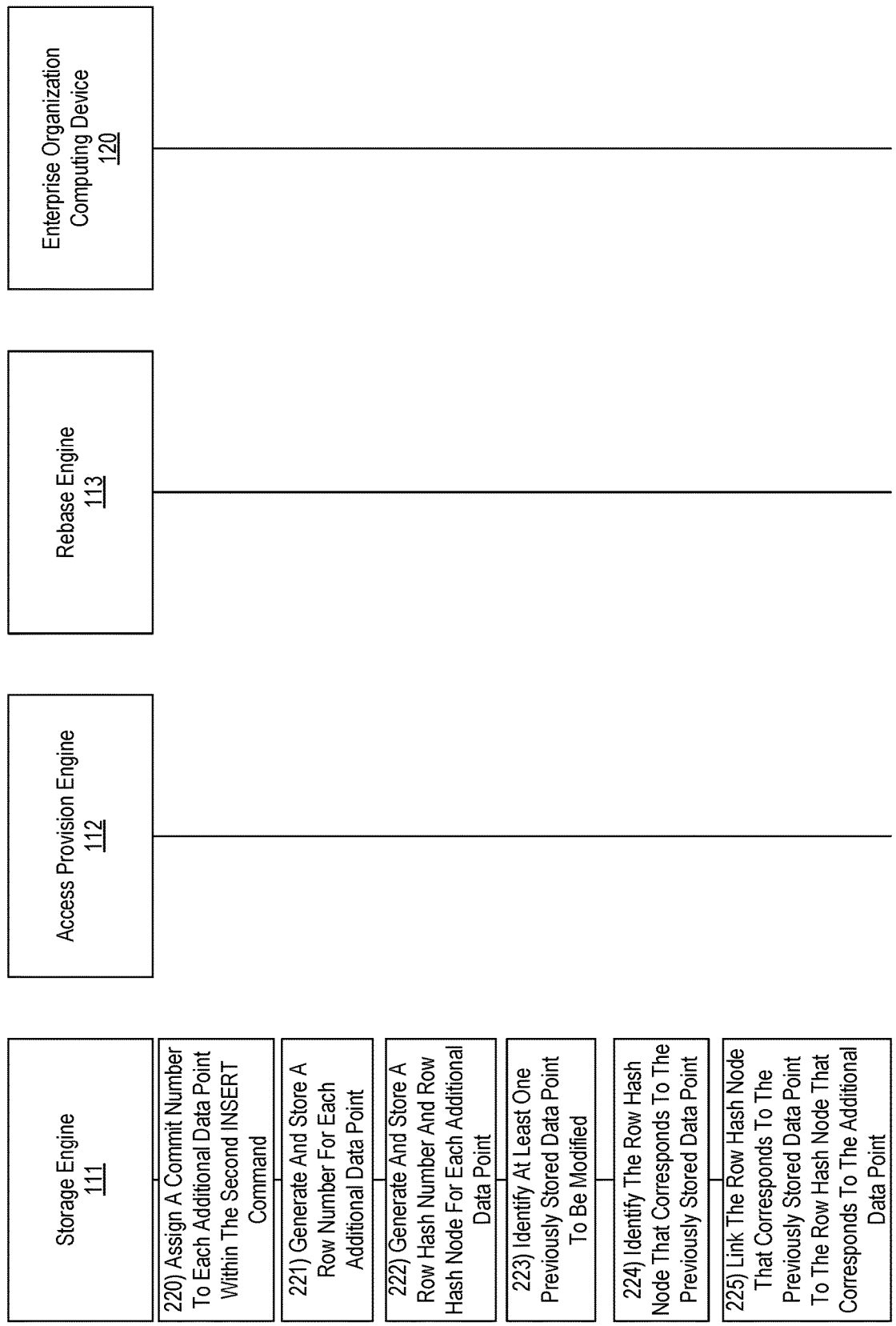

Referring to FIG. 2D, at step 220, storage engine 111 may identify the additional data points associated with the second command as well as the commit number that may correspond to the second command. Storage engine 111 may store, in the parent table and for each additional data point, the commit number associated with the second command. At step 221, storage engine 111 may generate, for each additional data point, a row number. The row number may correspond to the rows within the parent table and may indicate the location of each additional data point within the parent table. Storage engine 111 may store, in the parent table, the row numbers that corresponds to each additional data point.

At step 222, storage engine 111 may generate, for each additional data point, a row hash number. The row hash number associated with each additional data point may correspond to the row number associated with each additional data point, and may be used to illustrate the relationships between the additional data points and other data points within the parent table. Storage engine 111 may store, in the parent table, the row hash numbers that correspond to each additional data point. The row hash numbers that correspond to the additional data points may be used to generate additional row hash nodes and to update the relationships indicated in the row hash node ledger. Storage engine 111 may instruct blockchain engine 114 to generate, for each additional data point, a second plurality of row hash nodes to illustrate the relationships between the data points (e.g., relationships between the additional points, relationships between the first plurality of data points and the additional data points, or the like).

At step 223, storage engine 111 may identify, using the instructions from access provision engine 112 (e.g., the data points indicated in the modification request from enterprise organization computing device 120), at least one data point in the parent table (e.g., at least one previously stored data point, at least one data point of the first plurality of data points, or the like) to be modified. At step 224, storage engine 111 may identify the row hash node(s) associated with the at least one data point to be modified. At step 225, storage engine 111 may identify, using the additional data points and the instructions, at least one additional data point that comprises the modification. Storage engine 111 may identify the row hash node(s) associated with the at least one additional data point that comprises the modification. Storage engine 111 may instruct blockchain engine 114 to link the row hash nodes (e.g., to modify the row hash node ledger, or the like). In particular, storage engine 111 may instruct blockchain engine 114 to link (e.g., add a pointer from a first node to a second node, or the like) the row hash node associated with the data point to be modified to the row hash node associated with the additional data point that comprises the modification.

Figure 2E:
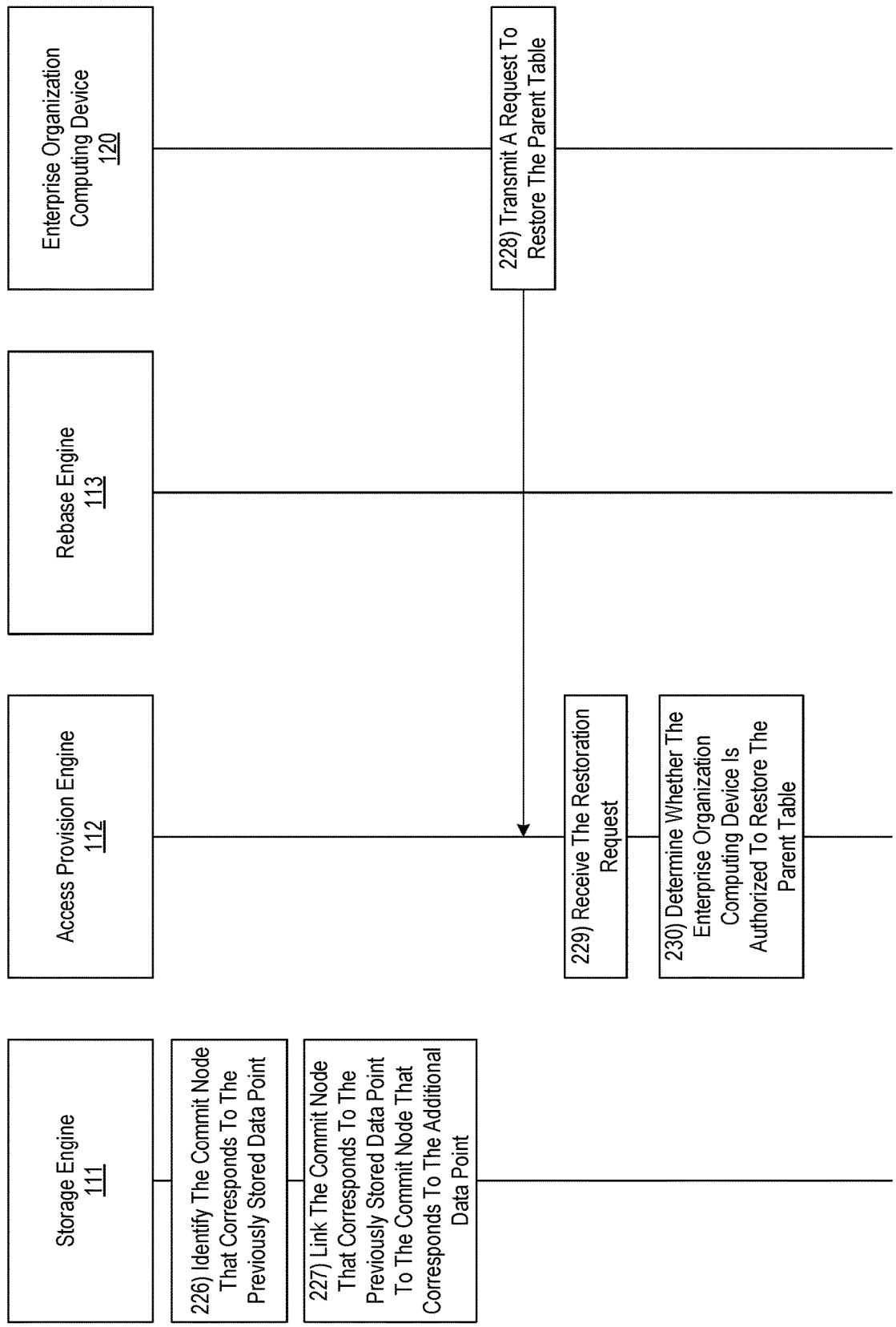
Figure 2F:
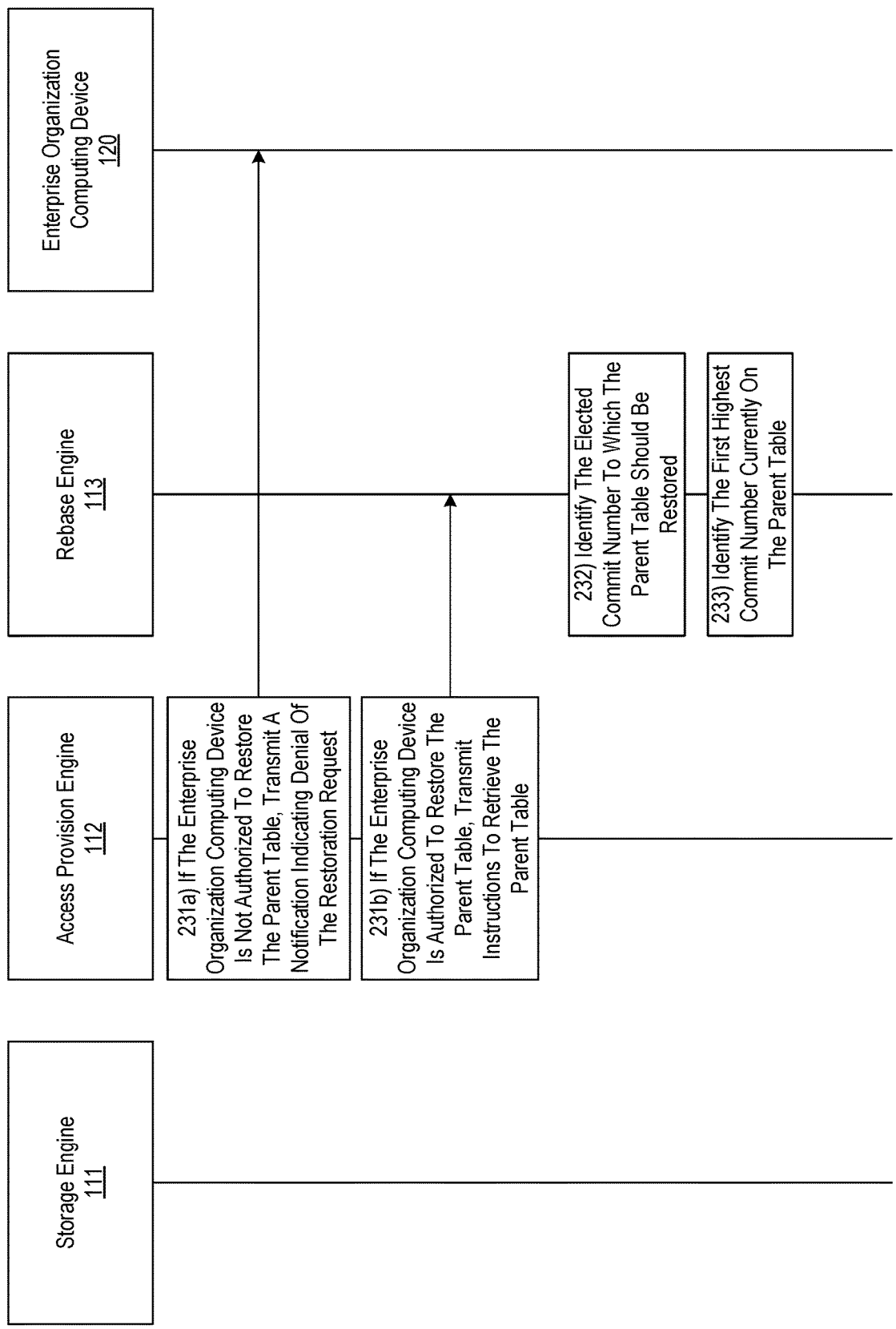

Referring to FIG. 2E, at step 226, storage engine 111 may identify the commit node(s) associated with the at least one data point to be modified (e.g., based on the data points indicated in the modification request from enterprise organization computing device 120). Storage engine 111 may also identify, using the additional data points and the instructions, the commit node(s) associated with the at least one additional data point that may contain the modifications. At step 227, storage engine 111 may instruct blockchain engine 114 to link the commit nodes (e.g., to modify the commit node ledger, or the like). In particular, storage engine 111 may instruct blockchain engine 114 to link the commit node associated with the data point to be modified to the commit node associated with the additional data point that comprises the modification.

At step 228, enterprise organization computing device 120 may transmit, to access provision engine 112, a request to restore the parent table to a previous state that corresponds to an elected commit number (e.g., a restoration request, or the like). In some instances, the restoration request may entail removing the data points that may have been added to the parent table after the elected commit number, or the like. The restoration request may comprise an indication of the elected commit number to which the parent table should be restored as well as authorization credentials associated with enterprise organization computing device 120, which may be used to determine whether enterprise organization computing device 120 is authorized to restore the parent table.

At step 229, access provision engine 112 may receive the restoration request from enterprise organization computing device 120. Access provision engine 112 may parse the restoration request and may extract the authorization credentials. At step 230, access provision engine 112 may parse the authorization credentials as well as access provision database 116 to determine whether the authorization credentials are listed in access provision database 116 as being authorized to restore the parent table. If, at step 230, access provision engine 112 determines that enterprise organization computing device 120 might not be authorized to restore the parent table, then, referring to FIG. 2F and at step 231a, access provision engine 112 may transmit a notification to enterprise organization computing device 120 indicating denial of the restoration request. Alternatively, if, at step 230, access provision engine 112 determines that enterprise organization computing device 120 may be authorized to restore the parent table, then, at step 231b, access provision engine 112 may transmit, to rebase engine 113, instructions to retrieve the parent table from enterprise organization data database 115 and/or to cache the parent table. The instructions may further indicate the elected commit number to which the parent table should be restored.

At step 232, rebase engine 113 may receive, from access provision engine 112, the instructions and may access enterprise organization data database 115 to retrieve the parent table. Rebase engine 113 may parse the instructions to identify the elected commit number to which the parent table should be restored. At step 233, rebase engine 113 may parse the parent table to identify the first highest commit number that may be indicated on the parent table (e.g., the largest commit number, the most recent commit number, or the like).

Figure 2G:
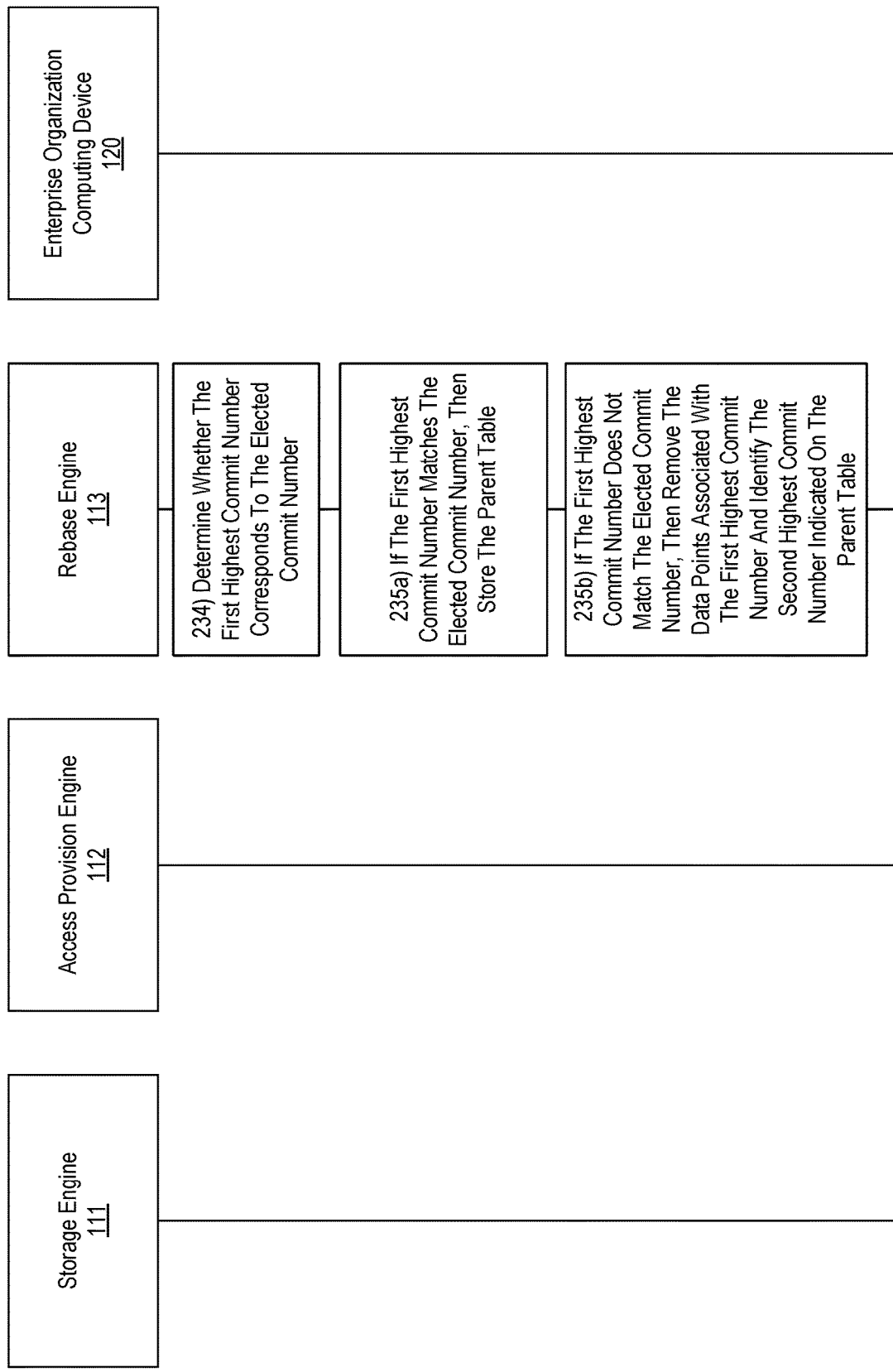

Referring to FIG. 2G, at step 234, rebase engine 113 may determine whether the first highest commit number currently indicated on the parent table corresponds to (e.g., matches, is the same as, or the like) the elected commit number indicated in the restoration request. If, at step 234, rebase engine 113 determines that the first highest commit number indicated on the parent table corresponds to the elected commit number, then, at step 235a, rebase engine 113 may store the parent table in enterprise organization data database 115. However, if, at step 234, rebase engine 113 determines that the first highest commit number indicated on the parent table might not correspond to the elected commit number, then, at step 235b, rebase engine 113 may remove (e.g., delete from the parent table, or the like) the first highest commit number from the parent table and, consequently, may remove the data points that correspond to the first highest commit number currently indicated on the parent table. Rebase engine 113 may analyze the second highest commit number indicated on the parent table (e.g., rebase engine 113 may reduce the first highest commit number by one to identify the second highest commit number, or the like), using the method described herein. Rebase engine 113 may continue to analyze the current highest commit number in the parent table until rebase engine 113 determines that the current highest commit number in the parent table corresponds to the elected commit number indicated in the restoration request.

Referring to FIG. 2H, at step 236, rebase engine 113 may determine whether any row hash nodes and/or commit nodes that correspond to the data points remaining in the parent table correspond to (e.g., are linked to, are within the same linked list as, or the like) row hash nodes and/or commit nodes that correspond to the data points that may have been removed from the parent table. Rebase engine 113 may instruct blockchain engine 114 to parse the parent table to determine the row hash nodes and/or commit nodes that correspond to the data points remaining in the parent table. Rebase engine 113 may further instruct blockchain engine 114 to determine, using the row hash node ledger and/or the commit node ledger, whether the row hash nodes and/or commit nodes that correspond to the remaining data points are linked to row hash nodes and/or commit nodes that correspond to the removed data points.

If, at step 236, blockchain engine 114 determines that the row hash nodes and/or commit nodes associated with the data points remaining in the parent table may correspond to the row hash nodes and/or commit nodes associated with the data points that were removed from the parent table, then, at step 237a, rebase engine 113 may instruct blockchain engine 114 to modify the row hash node ledger and/or the commit node ledger. As such, blockchain engine 114 may remove (e.g., prune, delete, erase, set to "NULL," remove the pointer between, or the like) the link between the row hash node and/or commit node that corresponds to the remaining data point and the row hash node and/or commit node that corresponds to the removed data point.

Alternatively, if, at step 236, blockchain engine 114 determines that the row hash nodes and/or commit nodes associated with the data points remaining in the parent table might not correspond to the row hash nodes and/or commit nodes associated with the data points that were removed from the parent table, then, at step 237b, rebase engine 113 may store the restored parent table in enterprise organization data database 115.

Figure 3A:
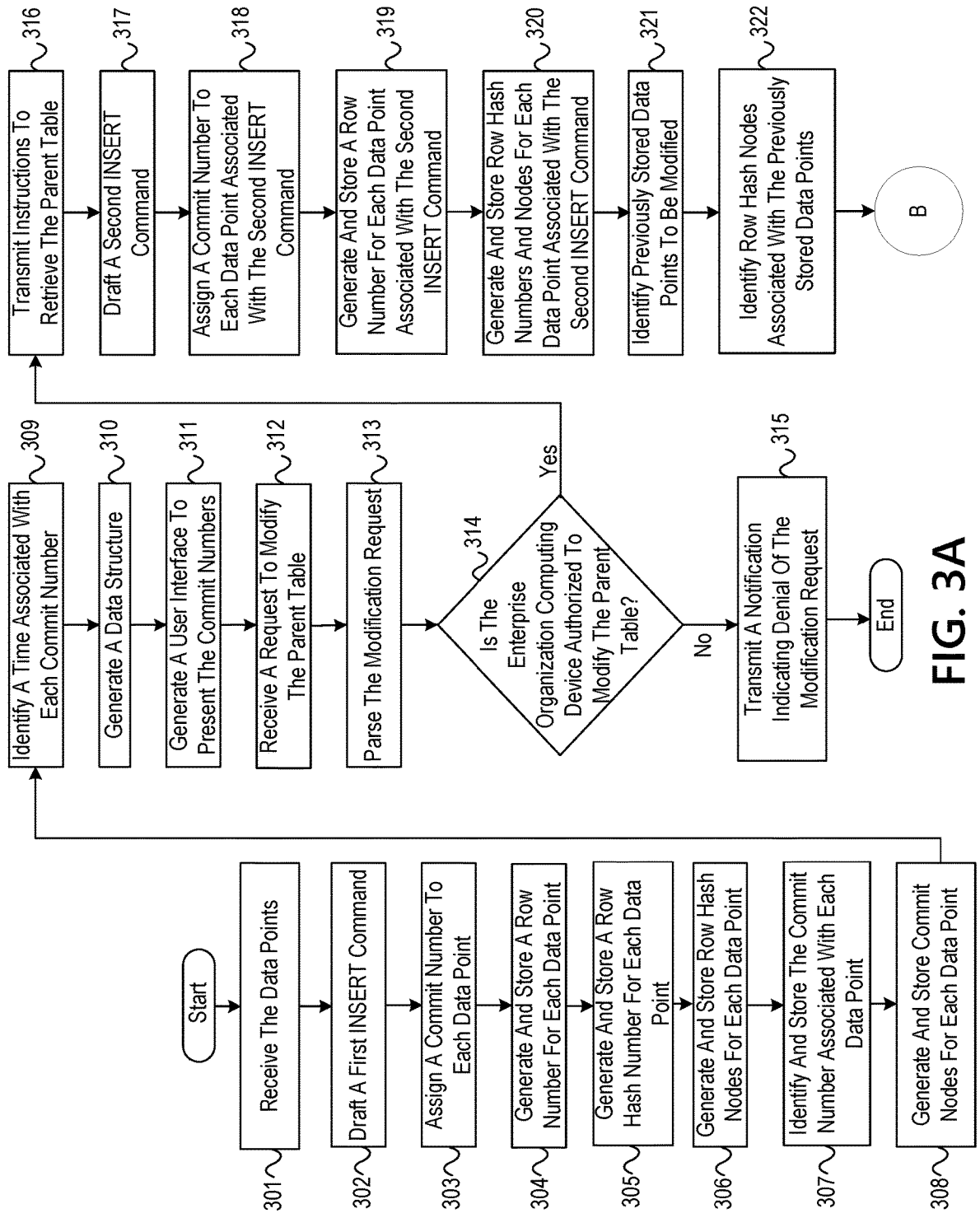
FIGS. 3A-3B depict an illustrative method for intelligently storing data in a fault tolerant system using robotic process automation and blockchain, in accordance with one or more example embodiments.
Figure 3B:
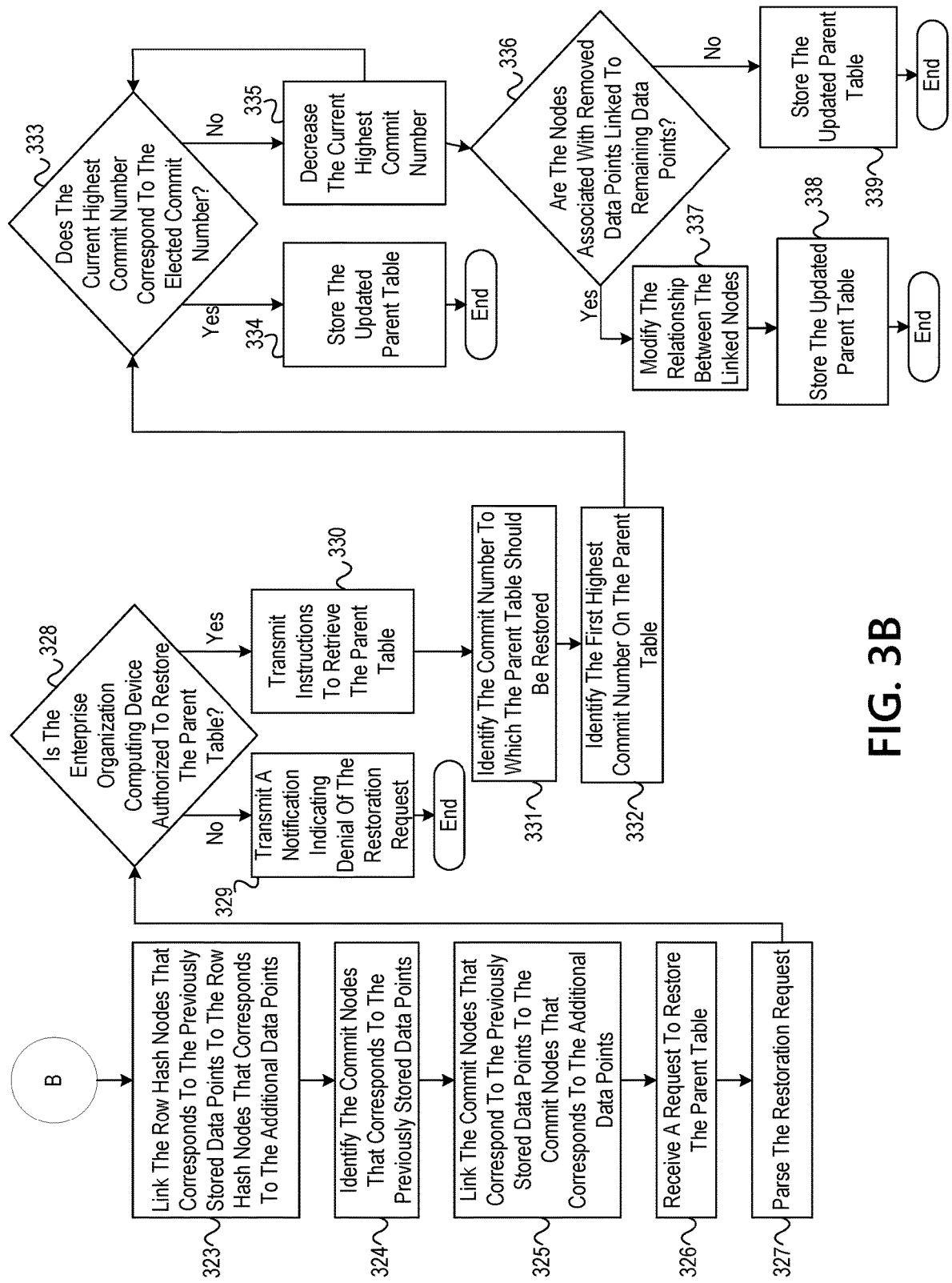

FIGS. 3A-3B depict an illustrative event sequence for intelligently storing, in real-time or near real-time, data in a fault tolerant system using robotic process automation and blockchain, in accordance with one or more aspects described herein. While aspects described with respect to FIGS. 3A-3B include the evaluation of a single request (e.g., a single modification request, a single restoration request, or the like), a plurality requests may be evaluated (e.g., in parallel) without departing from the present disclosure.

Referring to FIG. 3A, at step 301 storage engine 111 may receive, from enterprise organization computing device 120, a first plurality of data points to be stored in the parent table in enterprise organization data database 115 (e.g., data points that correspond to enterprise organization projects, processes, objectives, personnel, or the like). At step 302, storage engine 111 may draft, using at least one programming and/or scripting language, a first command (e.g., a first INSERT command, a first ADD command, or the like) to store the first plurality of data points in the parent table, wherein the first command may correspond to a commit number. At step 303, storage engine 111 may assign, to each data point of the first plurality of data points, the commit number that corresponds to the first command.

At step 304, storage engine 111 may generate, for each data point of the first plurality of data points, a row number (e.g., such that each data point may be located within the parent table, or the like). At step 305, storage engine 111 may generate, for each data point of the first plurality of data points, a row hash number. A row hash number may be an indicator (e.g., a way to track the corresponding data point, a hash of the row number, or the like) that may be used to illustrate the relationship between the corresponding data point and other data points within the parent table.

At step 306, storage engine 111 may instruct blockchain engine 114 to generate, for each data point of the first plurality of data points, a plurality of row hash nodes to illustrate the relationships between data points. In some instances, storage engine 111 may instruct blockchain engine 114 to do so using a blockchain system (e.g., a ledger, a linked list, or the like). At step 307, storage engine 111 may store the commit number associated with each data point within the first plurality of data points (e.g., the commit number associated with the first command, or the like). At step 308, storage engine 111 may instruct blockchain engine 114 to generate, for each data point of the first plurality of data points, a plurality of commit nodes to illustrate the relationships between the data points. In some instances, storage engine 111 may instruct blockchain engine 114 to do so using a blockchain system (e.g., a ledger, a linked list, or the like).

At step 309, storage engine 111 may determine a time that corresponds to the generation of first command (e.g., the first INSERT command, or the like). In some instances, the time may indicate a time at which each data point, of the first plurality of data points, was added to the parent table. At step 310, storage engine 111 may generate a data structure (e.g., a table different from the parent table, or the like) to present the times as well as the commit numbers and commands that correspond to each time. At step 311, access provision engine 112 may generate (e.g., using the data structure, or the like) a graphical user interface (GUI) to display the commit numbers, the time that corresponds to each commit number, and/or row numbers that correspond to each time. Access provision engine 112 may configure the GUI to receive input from enterprise organization computing device 120.

At step 312, access provision engine 112 may receive, from enterprise organization computing device 120, a request to modify the parent table (e.g., a modification request, or the like). The modification request may comprise an indication of the data points within the parent table to be modified and/or additional data points to be added to the parent table, wherein the additional data points may comprise the modifications. The modification request may further comprise authorization credentials that correspond to enterprise organization computing device 120, which may be used to determine whether enterprise organization computing device 120 is authorized to modify the parent table.

At step 313, access provision engine 112 may parse the modification request and may extract the authorization credentials. At step 314, access provision engine 112 may determine, using the extracted authorization credentials, whether enterprise organization computing device 120 is authorized to modify the parent table. Access provision engine 112 may parse the authorization credentials as well as access provision database 116 to determine whether the authorization credentials are listed in access provision database 116 as being authorized to modify the parent table. If, at step 314, access provision engine 112 determines that enterprise organization computing device 120 might not be authorized to modify the parent table, then, at step 315, access provision engine 112 may transmit a notification to enterprise organization computing device 120 indicating denial of the modification request. Alternatively, if, at step 314, access provision engine 112 determines that enterprise organization computing device 120 may be authorized to modify the parent table, then, at step 316, access provision engine 112 may transmit, to rebase engine 113, instructions to retrieve the parent table from enterprise organization data database 115 and/or to cache the parent table.

At step 317, storage engine 111 may generate a second command (e.g., a second INSERT command, a second ADD command, or the like) to store additional data points (e.g., a second plurality of data points, data points that may modify data points within the first plurality of data points, or the like). The second command may correspond to a different commit number when compared to the commit number that may correspond to the first command. At step 318, storage engine 111 may store, in the parent table and for each additional data point, the commit number associated with the second command.

At step 319, storage engine 111 may generate, for each additional data point, a row number. The row number may correspond to the rows within the parent table and may indicate the location of each additional data point within the parent table. At step 320, storage engine 111 may generate, for each additional data point, a row hash number. The row hash number associated with each additional data point may correspond to the row number associated with each additional data point, and may be used to generate row hash nodes to illustrate the relationships between the additional data points and other data points within the parent table. Storage engine 111 may instruct blockchain engine 114 to generate, for each additional data point, a second plurality of row hash nodes to illustrate the relationships between the data points (e.g., relationships between the additional points, relationships between the first plurality of data points and the additional data points, or the like).

At step 321, storage engine 111 may identify, using the instructions from access provision engine 112 (e.g., the data points indicated in the modification request from enterprise organization computing device 120), at least one data point in the parent table (e.g., at least one previously stored data point, at least one data point of the first plurality of data points, or the like) to be modified. At step 322, storage engine 111 may identify the row hash node(s) associated with the at least one data point to be modified. Storage engine 111 may identify the row hash node(s) associated with the at least one additional data point that comprises the modification.

Referring to FIG. 3B, at step 323, storage engine 111 may instruct blockchain engine 114 to link the row hash nodes (e.g., to modify the row hash node ledger, or the like). In particular, storage engine 111 may instruct blockchain engine 114 to link (e.g., add a pointer from a first node to a second node, or the like) the row hash node associated with the data point to be modified to the row hash node associated with the additional data point that comprises the modification.

At step 324, storage engine 111 may identify the commit node(s) associated with the at least one data point to be modified (e.g., based on the data points indicated in the modification request from enterprise organization computing device 120). Storage engine 111 may also identify, using the additional data points and the instructions, the commit node(s) associated with the at least one additional data point that may contain the modifications. At step 325, storage engine 111 may instruct blockchain engine 114 to link the commit nodes (e.g., to modify the commit node ledger, or the like). In particular, storage engine 111 may instruct blockchain engine 114 to link the commit node associated with the data point to be modified to the commit node associated with the additional data point that comprises the modification.

At step 326, access provision engine 112 may receive, from enterprise organization computing device 120, a request to restore the parent table to a previous state that corresponds to an elected commit number (e.g., a restoration request, or the like). The restoration request from enterprise organization computing device 120 may comprise the elected commit number and authorization credentials that correspond to enterprise organization computing device 120. At step 327, access provision engine 112 may parse the restoration request and may extract the authorization credentials. At step 328, access provision engine 112 may parse the authorization credentials as well as access provision database 116 to determine whether the authorization credentials are listed in access provision database 116 as being authorized to restore the parent table.

If, at step 328, access provision engine 112 determines that enterprise organization computing device 120 might not be authorized to restore the parent table, then, at step 329, access provision engine 112 may transmit a notification to enterprise organization computing device 120 indicating denial of the restoration request. However, if, at step 328, access provision engine 112 determines that enterprise organization computing device 120 may be authorized to restore the parent table, then, at step 330, access provision engine 112 may transmit, to rebase engine 113, instructions to retrieve the parent table from enterprise organization data database 115 and/or to cache the parent table.

At step 331, rebase engine 113 may receive, from access provision engine 112, the instructions and may access enterprise organization data database 115 to retrieve the parent table. Rebase engine 113 may parse the instructions to identify the elected commit number to which the parent table should be restored. At step 332, rebase engine 113 may parse the parent table to identify the first highest commit number that may be indicated on the parent table (e.g., the largest commit number, the most recent commit number, or the like). At step 333, rebase engine 113 may determine whether the current highest commit number (e.g., first highest commit number, or the like) currently indicated on the parent table corresponds to (e.g., matches, is the same as, or the like) the elected commit number indicated in the restoration request.

If, at step 333, rebase engine 113 determines that the current highest commit number indicated on the parent table corresponds to the elected commit number, then, at step 334, rebase engine 113 may store the parent table in enterprise organization data database 115. However, if, at step 333, rebase engine 113 determines that the current highest commit number indicated on the parent table might not correspond to the elected commit number, then, at step 335, rebase engine 113 may remove (e.g., delete from the parent table, or the like) the current highest commit number from the parent table and, consequently, may remove the data points that correspond to the current highest commit number indicated on the parent table. Rebase engine 113 may analyze the next highest commit number (e.g., the second highest commit number, or the like) indicated on the parent table. In some instances, rebase engine 113 may reduce the first highest commit number by one to identify the second highest commit number, and may analyze the second highest commit number using the methods described herein. Rebase engine 113 may continue to analyze the current highest commit number in the parent table until rebase engine 113 determines that the current highest commit number in the parent table corresponds to the elected commit number indicated in the restoration request.

At step 336, rebase engine 113 may determine whether any row hash nodes and/or commit nodes that correspond to the data points remaining in the parent table correspond to (e.g., are linked to, are within the same linked list as, or the like) row hash nodes and/or commit nodes that correspond to the data points that may have been removed from the parent table. Rebase engine 113 may instruct blockchain engine 114 to parse the parent table to determine the row hash nodes and/or commit nodes that correspond to the data points remaining in the parent table. Rebase engine 113 may further instruct blockchain engine 114 to determine, using the row hash node ledger and/or the commit node ledger, whether the row hash nodes and/or commit nodes that correspond to the remaining data points are linked to row hash nodes and/or commit nodes that correspond to the removed data points.

If, at step 336, blockchain engine 114 determines that the row hash nodes and/or commit nodes associated with the data points remaining in the parent table may correspond to the row hash nodes and/or commit nodes associated with the data points that were removed from the parent table, then, at step 337, rebase engine 113 may instruct blockchain engine 114 to modify the row hash node ledger and/or the commit node ledger. As such, blockchain engine 114 may remove (e.g., prune, delete, erase, set to "NULL," remove the pointer between, or the like) the link between the row hash node and/or commit node that corresponds to the remaining data point and the row hash node and/or commit node that corresponds to the removed data point. At step 338, rebase engine 113 may store the restored parent table in enterprise organization data database 115.

However, if, at step 336, blockchain engine 114 determines that the row hash nodes and/or commit nodes associated with the data points remaining in the parent table might not correspond to the row hash nodes and/or commit nodes associated with the data points that were removed from the parent table, then, at step 339, rebase engine 113 may store the restored parent table in enterprise organization data database 115.

As a result, the proposed solution may provide the following benefits: 1) real-time, or near real-time, use of dynamic data storage algorithms and blockchain infrastructure; 2) real-time, or near real-time, implementation of access provisioned data modification and restoration procedures; and 3) real-time, or near real-time, execution of a data rebase engine based on the access provisioned data modification and data restoration procedures.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a user computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method for efficiently modifying a computer-implemented database, the method comprising:
    at a computing device including one or more processors and memory:
        generating a first command to store a first plurality of data points in a computer-implemented database;
        assigning a first commit number to each data point of the first plurality of data points, wherein the first commit number is used to generate a first plurality of commit nodes for a first blockchain;
        generating a first plurality of row numbers, wherein a row number indicates a location of a data point within a parent table;
        generating, using the first plurality of row numbers, a first plurality of row hash numbers, wherein each row hash number is used to generate a first plurality of row hash nodes for a second blockchain different from the first blockchain;
        generating, using the first plurality of row hash nodes, a row hash node ledger comprising the second blockchain, wherein the row hash node ledger links the first plurality of row hash nodes to specify relationships between data points;
        generating, using the first plurality of commit nodes, a commit node ledger comprising the first blockchain, wherein the commit node ledger links the first plurality of commit nodes to specify the relationships between the data points;
        receiving, from an enterprise organization computing device, a request to modify a data point, of the first plurality of data points in the computer-implemented database, within the parent table;
        identifying a first row hash node in the second blockchain and a first commit node in the first blockchain that correspond to the data point to be modified;
        modifying, within the second blockchain representing the row hash node ledger, a relationship between the first row hash node and a second row hash node that corresponds to a second data point comprising a modification to the data point to be modified by linking the first row hash node to the second row hash node in the second blockchain; and
        modifying, within the first blockchain representing the commit node ledger, a relationship between the first commit node and a second commit node that corresponds to the second data point by linking the first commit node to the second commit node in the first blockchain.

2. The method of claim 1, wherein the first command comprises computer executable code that corresponds to an insert command and that is generated using at least one programming language.

3. The method of claim 1, wherein the row hash node ledger comprises a linked list, and wherein the linked list comprises pointers indicating a relationship between the first row hash node and the second row hash node.

4. The method of claim 1, wherein the second data point and the second commit node correspond to a second commit number.

5. The method of claim 1, wherein the commit node ledger comprises a linked list, and wherein the linked list comprises pointers indicating a relationship between the first commit node and the second commit node.

6. The method of claim 1, further comprising determining whether the enterprise organization computing device is authorized to modify the data point, wherein the determining comprises:
    parsing authorization credentials associated with the enterprise organization computing device;
    parsing an access authorization database; and
    determining whether the authorization credentials associated with the enterprise organization computing device are located in the access authorization database.

7. The method of claim 6, wherein the determining the enterprise organization computing device is authorized to modify the data point is based on determining the authorization credentials associated with the enterprise organization computing device are located in the access authorization database.

8. The method of claim 7, further comprising determining the enterprise organization computing device is not authorized to modify the data point based on determining the authorization credentials associated with the enterprise organization computing device are not located in the access authorization database.

9. The method of claim 1, wherein the receiving the request to modify the data point further comprises:
    generating a second command to store a second plurality of data points, wherein the second plurality of data points comprises modifications to the first plurality of data points and comprises the second data point;

assigning a second commit number to each data point of the second plurality of data points, wherein the second commit number is used to generate a second plurality of commit nodes;

generating a second plurality of row numbers, wherein each row number indicates a location of each data point, of the second plurality of data points, within the parent table; and generating, based on the second plurality of row numbers, a second plurality of row hash numbers, wherein the second plurality of row hash numbers is used to generate a second plurality of row hash nodes.

10. The method of claim 9, further comprising receiving, from the enterprise organization computing device, a request to restore the parent table to a previous state.

11. The method of claim 10, wherein the restoring the parent table comprises:

electing a commit number that corresponds to the previous state;

identifying commit numbers that are greater than the elected commit number;

removing data points, of the first plurality of data points and the second plurality of data points, that correspond to the commit numbers that are greater than the elected commit number by:

identifying row hash nodes in the second blockchain, of the first plurality of row hash nodes and the second plurality of row hash nodes, that are linked to row hash nodes in the second blockchain, of the first plurality of row hash nodes and the second plurality of row hash nodes, that correspond to the removed data points; and removing the data points, of the first plurality of data points and the second plurality of data points, that correspond to the identified row hash nodes, including modifying the second blockchain to modify links between the first plurality of row hash nodes and the second plurality of row hash nodes.

12. The method of claim 11, wherein the restoring the parent table further comprises:

identifying commit nodes, of the first plurality of commit nodes and the second plurality of commit nodes in the first block chain, that are linked to commit nodes, of the first plurality of commit nodes and the second plurality of commit nodes in the first blockchain, that correspond to the removed data points; and removing the data points, of the first plurality of data points and the second plurality of data points, that correspond to the identified commit nodes, including modifying the first blockchain to modify links between the first plurality of commit nodes and the second plurality of commit nodes.

13. A computing platform configured for efficiently modifying a computer-implemented database, the computing platform comprising:

at least one processor;

a communication interface communicatively coupled to the at least one processor; and memory storing computer-readable instructions that, when executed by the at least one processor, cause the computing platform to:

generate a first command to store a first plurality of data points in a computer-implemented database;

assign a first commit number to each data point of the first plurality of data points, wherein the first commit number is used to generate a first plurality of commit nodes for a first blockchain;

generate a first plurality of row numbers, wherein a row number indicates a location of a data point within a parent table;

generate, using the first plurality of row numbers, a first plurality of row hash numbers, wherein each row hash number is used to generate a first plurality of row hash nodes for a second blockchain different from the first blockchain;

generate, using the first plurality of row hash nodes, a row hash node ledger comprising the second blockchain, wherein the row hash node ledger links the first plurality of row hash nodes to specify relationships between data points;

generate, using the first plurality of commit nodes, a commit node ledger comprising the first blockchain, wherein the commit node ledger links the first plurality of commit nodes to specify the relationships between the data points;

receive, from an enterprise organization computing device, a request to modify a data point, of the first plurality of data points in the computer-implemented database, within the parent table;

identify a first row hash node in the second blockchain and a first commit node in the first blockchain that correspond to the data point to be modified;

modify, within the second blockchain representing the row hash node ledger, a relationship between the first row hash node and a second row hash node that corresponds to a second data point comprising a modification to the data point to be modified by linking the first row hash node to the second row hash node in the second blockchain; and modify, within the first blockchain representing the commit node ledger, a relationship between the first commit node and a second commit node that corresponds to the second data point by linking the first commit node to the second commit node in the first blockchain.

14. The computing platform of claim 13, wherein the receiving the request to modify the data point further causes the computing platform to:

generate a second command to store a second plurality of data points, wherein the second plurality of data points comprises modifications to the first plurality of data points and comprises the second data point;

assign a second commit number to each data point of the second plurality of data points, wherein the second commit number is used to generate a second plurality of commit nodes;

generate a second plurality of row numbers, wherein each row number indicates a location of each data point, of the second plurality of data points, within the parent table; and generate, based on the second plurality of row numbers, a second plurality of row hash numbers, wherein the second plurality of row hash numbers is used to generate a second plurality of row hash nodes.

15. One or more non-transitory computer-readable media storing instructions that, when executed by a computing platform comprising at least one processor, memory, and a communication interface, cause the computing platform to:

generate a first command to store a first plurality of data points in a computer-implemented database;

assign a first commit number to each data point of the first plurality of data points, wherein the first commit number is used to generate a first plurality of commit nodes for a first blockchain;

generate a first plurality of row numbers, wherein a row number indicates a location of a data point within a parent table;

generate, using the first plurality of row numbers, a first plurality of row hash numbers, wherein each row hash number is used to generate a first plurality of row hash nodes for a second blockchain different from the first blockchain;

generate, using the first plurality of row hash nodes, a row hash node ledger comprising the second blockchain, wherein the row hash node ledger links the first plurality of row hash nodes to specify relationships between data points;

generate, using the first plurality of commit nodes, a commit node ledger comprising the first blockchain, wherein the commit node ledger links the first plurality of commit nodes to specify the relationships between the data points;

receive, from an enterprise organization computing device, a request to modify a data point, of the first plurality of data points in the computer-implemented database, within the parent table;

identify a first row hash node in the second blockchain and a first commit node in the first blockchain that correspond to the data point to be modified;

modify, within the second blockchain representing the row hash node ledger, a relationship between the first row hash node and a second row hash node that corresponds to a second data point comprising a modification to the data point to be modified by linking the first row hash node to the second row hash node in the second blockchain; and modify, within the first blockchain representing the commit node ledger, a relationship between the first commit node and a second commit node that corresponds to the second data point by linking the first commit node to the second commit node in the first blockchain.

16. The non-transitory computer-readable media of claim 15, wherein the receiving the request to modify the data point further causes the computing platform to:

generate a second command to store a second plurality of data points, wherein the second plurality of data points comprises modifications to the first plurality of data points and comprises the second data point;

assign a second commit number to each data point of the second plurality of data points, wherein the second commit number is used to generate a second plurality of commit nodes;

generate a second plurality of row numbers, wherein each row number indicates a location of each data point, of the second plurality of data points, within the parent table; and generate, based on the second plurality of row numbers, a second plurality of row hash numbers, wherein the second plurality of row hash numbers is used to generate a second plurality of row hash nodes.

* * * * *